(12) United States Patent
Okano et al.

(10) Patent No.: US 8,922,908 B2
(45) Date of Patent: Dec. 30, 2014

(54) LENS APPARATUS

(71) Applicant: Olympus Imaging Corp., Shibuya-ku, Tokyo (JP)

(72) Inventors: Koji Okano, Hachioji (JP); Junya Harada, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 33 days.

(21) Appl. No.: 13/886,895

(22) Filed: May 3, 2013

(65) Prior Publication Data

US 2013/0301146 A1 Nov. 14, 2013

(30) Foreign Application Priority Data

May 11, 2012 (JP) ................................. 2012-109804

(51) Int. Cl.
  *G02B 15/14* (2006.01)
  *G02B 7/02* (2006.01)
(52) U.S. Cl.
  USPC ........................................ 359/694; 359/819
(58) Field of Classification Search
  USPC .................... 359/694–704, 811–830
  See application file for complete search history.

(56) References Cited

U.S. PATENT DOCUMENTS

| 7,403,342 B2 | 7/2008 | Sasaki |
| 7,929,229 B2 * | 4/2011 | Ugawa et al. ................. 359/824 |
| 8,498,528 B2 * | 7/2013 | Suzuka ........................... 396/55 |

FOREIGN PATENT DOCUMENTS

| JP | 04-317015 A | 11/1992 |
| JP | 2521866 Y2 | 1/1997 |
| JP | 2007-114707 A | 5/2007 |

* cited by examiner

*Primary Examiner* — Mohammed Hasan
(74) *Attorney, Agent, or Firm* — Holtz, Holtz, Goodman & Chick PC

(57) ABSTRACT

A lens apparatus includes a lens housing, driven member that is driven in a first direction. A lens barrel body that includes a lens, is separated from the driven member upon receiving an impact including a component of a second direction and can move. A drive section drives the driven member in the first direction. When the lens housing receives an impact including a component of the first direction, the drive member and the driven member are separated apart, and the driven member and the lens barrel body move together in the first direction, and when the lens housing receives an impact including the component of the second direction, the drive member prevents the driven member from moving in the second direction, the driven member and the lens barrel body are separated apart, and the lens barrel body moves.

8 Claims, 17 Drawing Sheets

LENS APPARATUS

This application claims the benefit of Japanese Application No. 2012-109804 filed in Japan on May 11, 2012, the contents of which are incorporated herein by this reference.

BACKGROUND OF THE INVENTION

1. Field of the Invention

The present invention relates to a lens apparatus, and more specifically, to an impact-resistant structure of a movable barrel member in a lens apparatus applied to an image pickup apparatus such as a camera.

2. Description of the Related Art

Conventionally, image pickup apparatuses such as cameras, for example, digital cameras and video cameras, have been generally commercialized and become widespread, which are configured to sequentially convert an optical image formed by an image pickup optical system to an image signal using a photoelectric conversion element or the like, record the image signal obtained in a recording medium as image data in a predetermined format, and include an image display apparatus such as a liquid crystal display apparatus (LCD) that reproduces and displays the image data recorded in the recording medium as an image.

Image pickup apparatuses of this type are generally provided with a lens apparatus including an image pickup optical system for forming an optical image of an object on a light receiving surface of an image pickup device such as a photoelectric conversion element. This lens apparatus is configured by including an image pickup optical system made up of a plurality of optical lenses or the like and a lens holding barrel member that holds the respective optical lenses in group units, with a predetermined optical lens (and a plurality of lens holding barrel members that hold the optical lens) among the plurality of optical lenses being configured to be able to move in a direction along an optical axis to realize, for example, auto focus operation and variable power operation (zoom operation). Here, the optical lens provided so as to be movable in the direction along the optical axis is called a "movable lens" and the barrel member that holds this movable lens is called a "movable lens holding barrel member."

As lens apparatuses applied to conventional image pickup apparatuses, various types of lens apparatuses are proposed and commercialized which are provided with a movable lens holding barrel member pivotably supported by a hanger shaft provided parallel to the direction along the optical axis so as to be movable in the same direction, with the movable lens holding barrel member being structured to be movable in the optical axis direction by a nut member that moves in a direction along the optical axis by receiving a drive force from a drive source such as a separately provided motor.

The conventional image pickup apparatus using a lens apparatus having a movable lens holding barrel in such a configuration may be dropped onto a floor or ground or the like during use. In this case, due to an impact by the drop or the like, the movable lens holding barrel may move along the hanger shaft and collide with an internal structure, causing damage to the lens apparatus.

Examples of basic measures for reinforcing resistance against such a drop impact or the like include increasing a thickness of parts and changing a material to improve resistance of parts.

However, the above means of improving the resistance of the parts involves problems such as an increase in manufacturing cost, upsizing of the apparatus itself accompanied by upsizing of the parts and increases of weights of the parts. When weights of the movable lens holding barrel parts increase, there arises a problem that when the parts receive a drop impact or the like, rotation moment centered on the hanger shaft causes stress concentration, which may cause the parts to be more likely to be damaged with cracks or the like.

On the other hand, means disclosed, for example, in Japanese Patent Application Laid-Open Publication No. 2007-114707 adopts a two-body structure for a lens holding barrel which is a driven barrel, interposes a spring between both members and causes the two members constituting the driven barrel to engage with each other as one body by an urging force thereof.

Upon receiving a drop impact or the like, such a configuration causes the two members of the driven barrel to be disengaged from each other against the urging force of the spring, and thereby obtains an effect that damage to the driven barrel can be prevented.

However, upon receiving a drop impact or the like, the means disclosed in Japanese Patent Application Laid-Open Publication No. 2007-114707 above may fail to disengage the engagement between the two members constituting the driven barrel depending on the direction in which the impact is applied. In such a case, the impact received may not be alleviated and may be transmitted directly to the driven barrel, causing damage to the members. Furthermore, when an impact as large as exceeding the urging force of the spring is received, there arises a problem that the impact received may be directly transmitted to the driven barrel, causing damage to the members in a similar manner. Moreover, no description is given about sequentially alleviating the impact transmitted to the driven barrel.

SUMMARY OF THE INVENTION

A lens apparatus according to an aspect of the present invention includes a lens housing, a driven member that is driven in a first direction along an optical axis, a lens barrel body that includes a lens, is arranged so as to be movable along the optical axis, is separated from the driven member upon receiving an impact of predetermined magnitude including a component of a second direction opposite to the first direction and moves along the optical axis, and a drive member that drives the driven member in the first direction, wherein the lens apparatus is configured such that when the lens housing receives an impact of predetermined magnitude including a component of the first direction, the drive member and the driven member are separated apart, and the driven member and the lens barrel body move together in the first direction, and when the lens housing receives an impact of predetermined magnitude including the component of the second direction, the drive member prevents the driven member from moving in the second direction, the driven member and the lens barrel body are thereby separated apart, and the lens barrel body moves along the optical axis.

Furthermore, in the lens apparatus according to the one aspect of the present invention, an impact receiving surface is formed in each of the lens housing, the driven member and the lens barrel body, and when the lens housing receives an impact of predetermined magnitude including the component of the first direction or the second direction, the impact receiving surface of the lens housing and the impact receiving surface of the driven member or the lens barrel body come into contact with each other to receive the impact.

Advantageous effects of the present invention will be made clearer from the following detailed description.

DETAILED DESCRIPTION OF THE PREFERRED EMBODIMENTS

Figure 1:
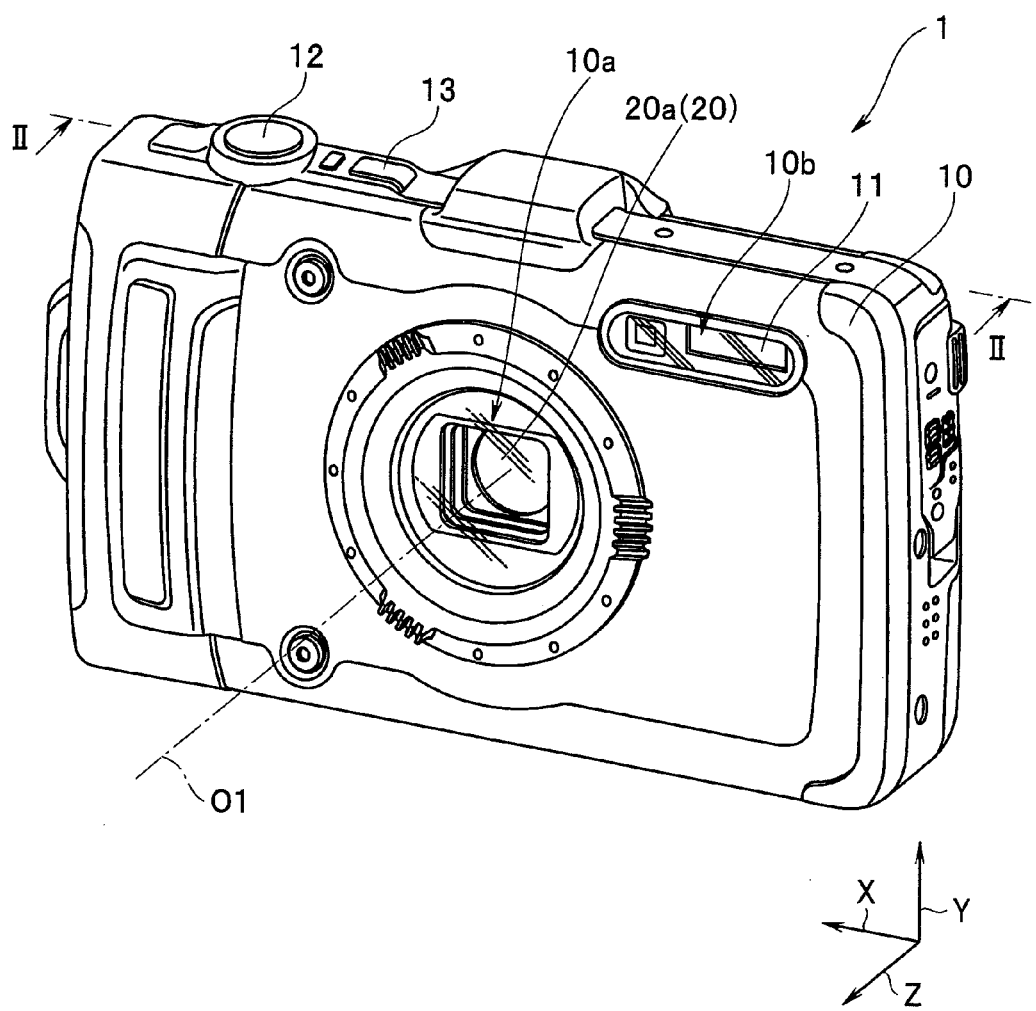
FIG. 1 is an external perspective view illustrating an image pickup apparatus provided with a lens apparatus according to an embodiment of the present invention.

Hereinafter, the present invention will be described using an embodiment illustrated in the accompanying drawings. Note that in the respective drawings used in the following description, respective components may be shown in scales varying from one component to another to illustrate the respective components in sizes that are recognizable in the drawings. Therefore, the quantity of the components, shapes of the components, size ratio among the components and relative positional relationships among the components in the present invention are not exclusively limited to the illustrated aspects.

Figure 2:
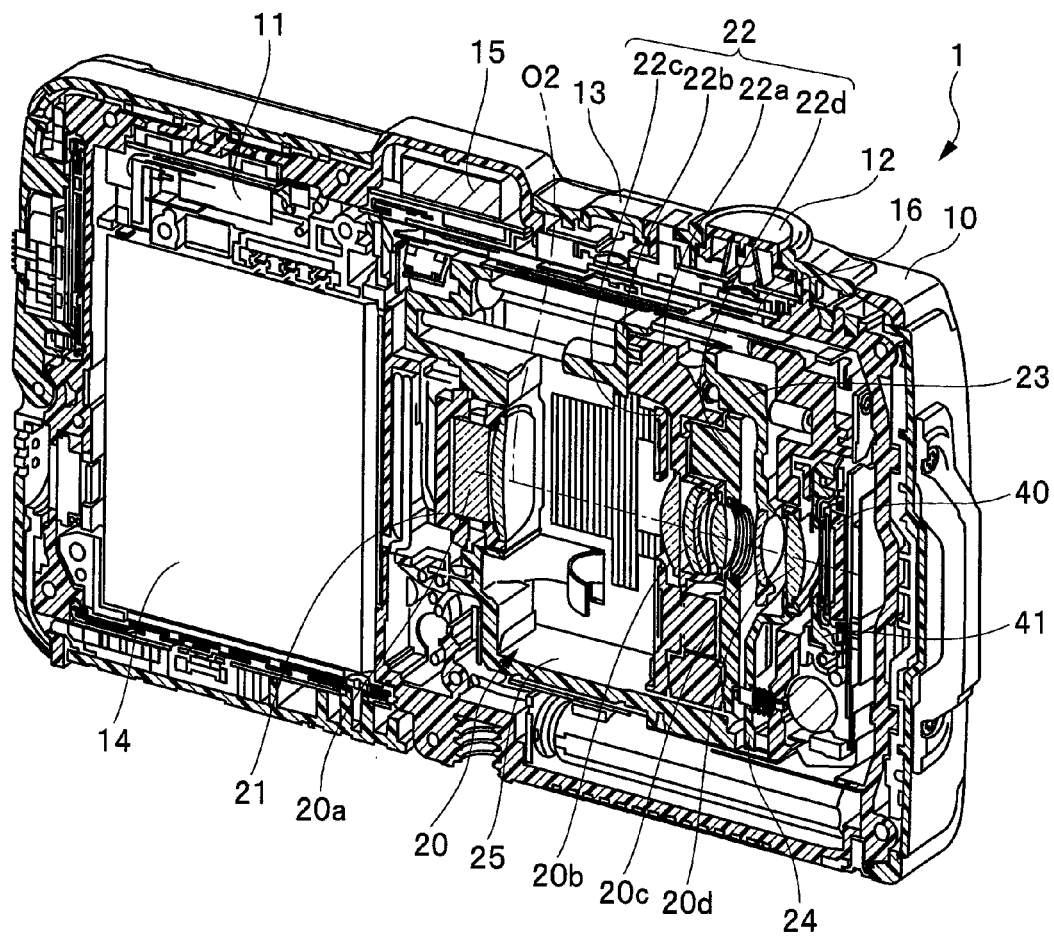
FIG. 2 is a longitudinal cross-sectional view of FIG. 1 cut along a line [II]-[II]
Figure 3:
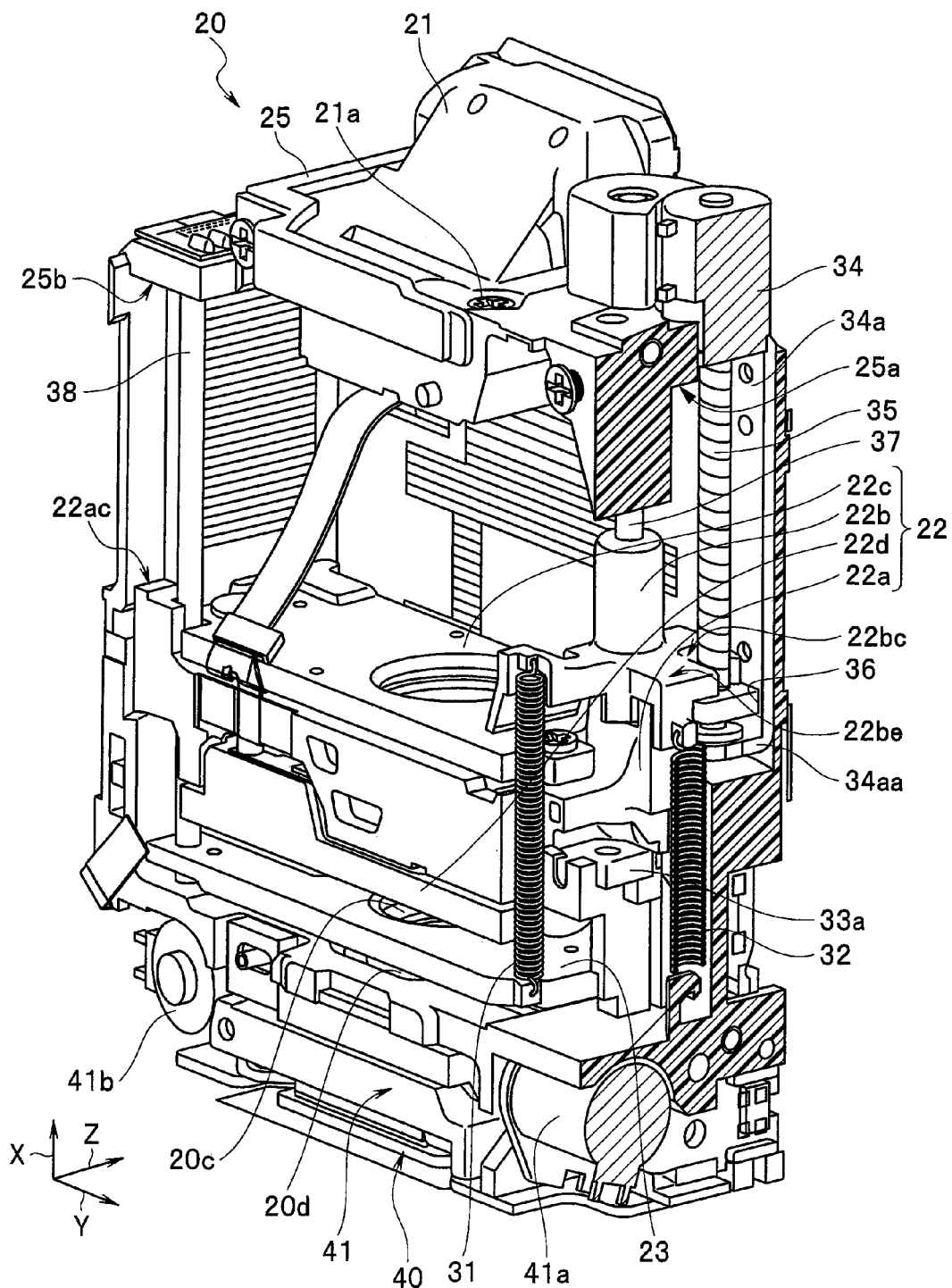
FIG. 3 is an external perspective view of the lens apparatus provided for the image pickup apparatus in FIG. 1 extracted and viewed from a rear side.
Figure 4:
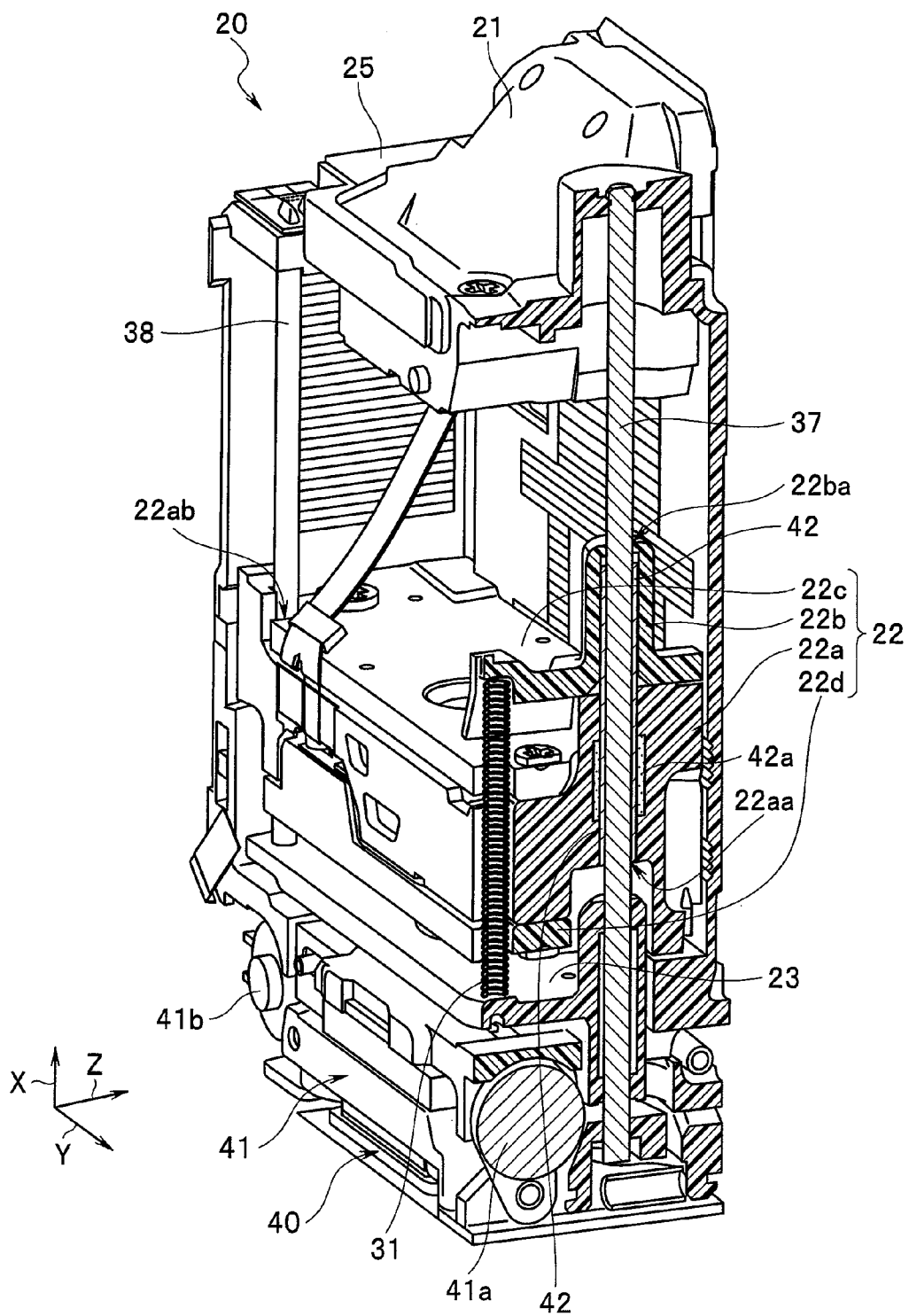
FIG. 4 is an external perspective view of the lens apparatus provided for the image pickup apparatus in FIG. 1 extracted and viewed from a rear side.

FIG. 1 to FIG. 29 are diagrams illustrating an embodiment of the present invention. Among them, FIG. 1 is an external perspective view illustrating an image pickup apparatus provided with a lens apparatus according to the present embodiment. FIG. 2 is a diagram illustrating an internal structure of the image pickup apparatus in FIG. 1 and is a longitudinal cross-sectional view of FIG. 1 cut along a line [II]-[II]. FIG. 3 and FIG. 4 are external perspective views of the lens apparatus provided for and extracted from the image pickup apparatus in FIG. 1, viewed from a rear side thereof. Note that FIG. 3 and FIG. 4 show partially cut-out view of the lens housing in the lens apparatus to illustrate an internal configuration thereof.

First, schematic configurations of the lens apparatus and the image pickup apparatus provided with this lens apparatus according to the one embodiment of the present invention will be described below using FIG. 1 to FIG. 4.

The present embodiment illustrates a case where the present invention is applied to a lens apparatus adopted for an image pickup apparatus (hereinafter, simply abbreviated as "camera") such as digital camera and video camera.

Note that in the present embodiment, a surface facing an object when a camera is used will be referred to as a "front surface" of the camera. Furthermore, a surface that a user faces when the camera is used will be referred to as a "rear surface" of the camera. Furthermore, a surface on which a shutter release button among operation members is arranged will be referred to as a "top surface." A surface facing the top surface of the camera will be referred to as a "bottom surface." Furthermore, surfaces arranged on both sides of the camera in normal usage will be referred to as a "left side surface" and a "right side surface" respectively. Regarding distinction between left and right in this case, left or right is distinguished as a left side or a right side respectively when viewed from an object side toward the front surface of the camera.

A camera 1 which is an image pickup apparatus to which the lens apparatus of the present embodiment is applied is constructed of a camera housing 10 having a flat shape as a whole and various internal components accommodated in this camera housing 10 as shown in FIG. 1 and FIG. 2.

The camera housing 10 is a member that forms an outer shell of the camera 1 and various configuration units are accommodated therein (see FIG. 2). Openings (10a and 10b) for exposing a part of an internal configuration unit are formed on an outer surface of the camera housing 10, and a plurality of operation portions (12 and 13 or the like) for performing various operations are arranged in their respective predetermined regions.

More specifically, the image pickup opening 10a for exposing a first lens group 20a of a lens apparatus 20 is formed, for example, in a substantially center of the front surface of the camera housing 10. Furthermore, the illumination light emitting opening 10b of a flash light emitting apparatus 11 is formed in a region close to an upper edge on the right side of the front surface of the camera housing 10 as viewed from the front. On the other hand, a shutter release button 12 and a power button 13 or the like among the plurality of operation members are arranged on the top surface of the camera housing 10.

As shown in FIG. 2, the flash light emitting apparatus 11, a battery 14, a GPS unit 15, an electric substrate 16, the lens apparatus 20, an image pickup unit 40, an image stabilization unit 41 or the like are accommodated and arranged in their respective predetermined regions inside the camera housing 10.

The flash light emitting apparatus 11 is a unit for emitting auxiliary illumination light for image pickup.

A display panel (not shown) is arranged on an upper rear side of the battery 14. This display panel is a display section for displaying an image signal acquired by the image pickup unit 40 (which will be described later; see FIG. 3 and FIG. 4) and an image or the like based on image data recorded in a recording medium (not shown) and displaying a setting menu when making various settings, and, for example, a liquid crystal display apparatus (LCD) is applied thereto.

The GPS unit 15 is a receiver corresponding to a global positioning system and is a unit for acquiring various types of additional information (e.g., time information, position information) to be added to image pickup data.

Electric parts such as a shutter switch and a power switch on which the shutter release button 12 and the power button 13 or the like act are mounted and arranged on the electric substrate 16. Although FIG. 2 omits illustrations of other electric substrates (other than the electric substrate 16) or the like that constitute an electric circuit inside the camera 1 to prevent complexity of the drawing, the present camera 1 also includes substrates and the like similar to those provided for a conventional camera in a general configuration.

The image pickup unit 40 includes an image pickup device (CCD, CMOS or the like is applied thereto) such as a photoelectric conversion element, an electric circuit that drives this image pickup device and an image signal processing circuit that processes an output signal from the image pickup device, and is an image pickup system unit for acquiring an image signal.

The image stabilization unit 41 is a unit configured by including a drive mechanism (image stabilizing motors 41a, 41b or the like; see FIG. 3 and FIG. 4) for moving the image pickup unit 40 in a direction along a light receiving surface thereof according to micro camera shake of the camera 1 during image pickup operation and an electric circuit or the like that performs drive control thereof.

The lens apparatus 20 is a lens apparatus of the present invention configured of an image pickup optical system made up of an optical member such as a plurality of optical lenses, lens holding barrels that hold the respective optical lenses in group units, a plurality of drive members for moving these respective lens holding barrels at predetermined timing in a predetermined direction by a predetermined amount, and the like.

The lens apparatus 20 which is a lens apparatus of the present embodiment adopts an image pickup optical system made up of a so-called folded optics system that folds an optical axis using a reflected optical member as shown in FIG. 1 to FIG. 4. More specifically, the lens apparatus 20 is configured so as to fold an optical axis (O1) of a luminous flux introduced into the interior from the front surface side of the camera 1 by substantially 90 degrees using the reflected optical member (first lens group 20a) of the lens apparatus 20, guide the luminous flux to the image pickup unit 40 side and radiate the luminous flux onto the light-receiving surface thereof.

In this case, to express the optical axis of the image pickup optical system more specifically, the optical axis from an object (not shown) arranged on the front surface side of the camera 1 until it impinges on the reflected optical member (first lens group 20a) is assumed to be a first optical axis and denoted by reference numeral O1. The optical axis O1 is assumed to be parallel to a direction along an arrow Z shown in FIG. 1 to FIG. 4. Furthermore, the optical axis after the first optical axis O1 is folded by the reflected optical member (first lens group 20a) until it reaches the light-receiving surface of the image pickup unit 40 is assumed to be a second optical axis and denoted by reference numeral O2. This optical axis O2 is assumed to be parallel to a direction along an arrow X shown in FIG. 1 to FIG. 4.

That is, the lens apparatus 20 of the present embodiment is arranged so that the second optical axis O2 is parallel to the arrow X as shown in FIG. 2 or the like. Therefore, the image pickup unit 40 is arranged in a region close to the left side surface inside the camera housing 10 when viewed from the front of the camera 1.

Assuming the rest of the configuration of the camera 1 is substantially the same as that of a conventional camera in a general format, description thereof will be omitted.

Figure 5:
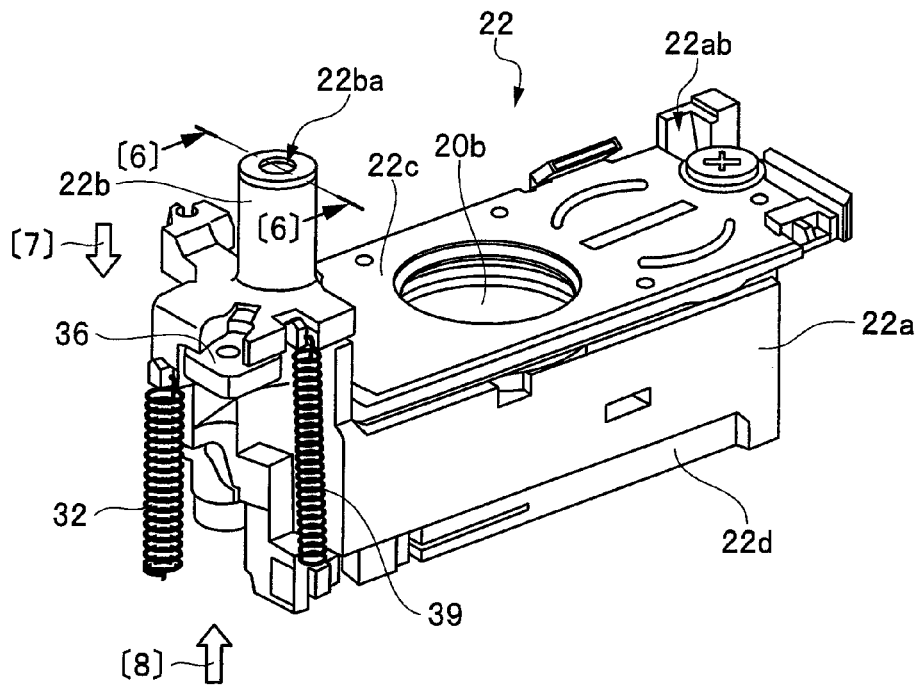
FIG. 5 is a perspective view mainly illustrating a front side of a second holding barrel extracted from the lens apparatus according to the one embodiment of the present invention.
Figure 6:
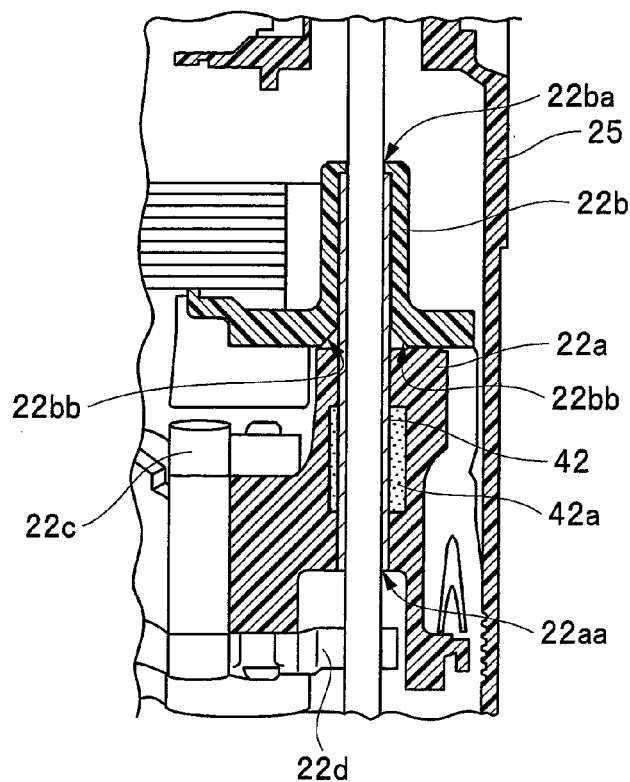
FIG. 6 is an enlarged cross-sectional view of principal parts along a line [6]-[6] in FIG. 5 of the second holding barrel in FIG. 5 in a normal state in which a body and a support arm portion are united together.
Figure 7:
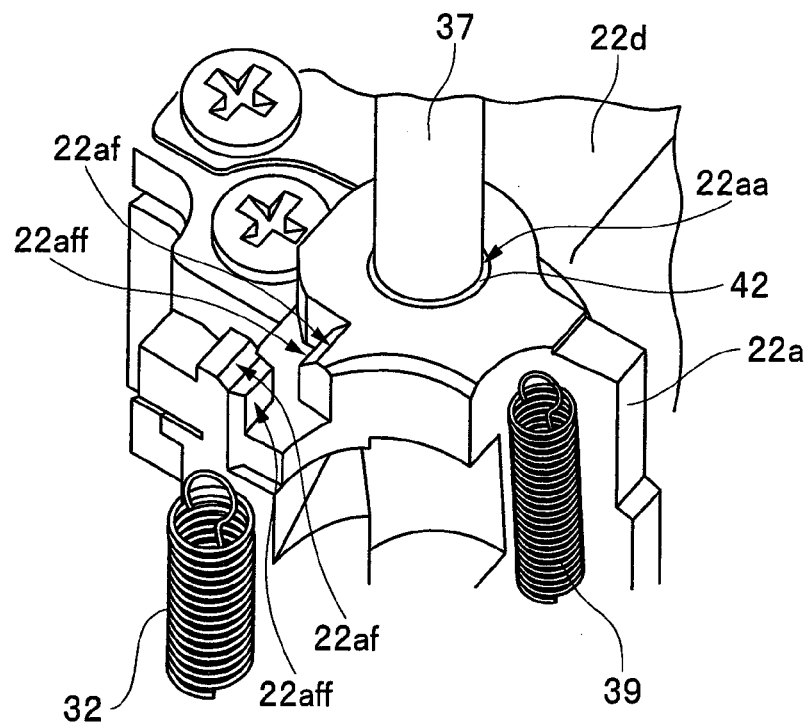
FIG. 7 is an enlarged perspective view of principal parts when the vicinity of a through hole of the body is viewed from a direction [7] in FIG. 5 with a support arm portion (driven member) removed from the second holding barrel in FIG. 5.
Figure 8:
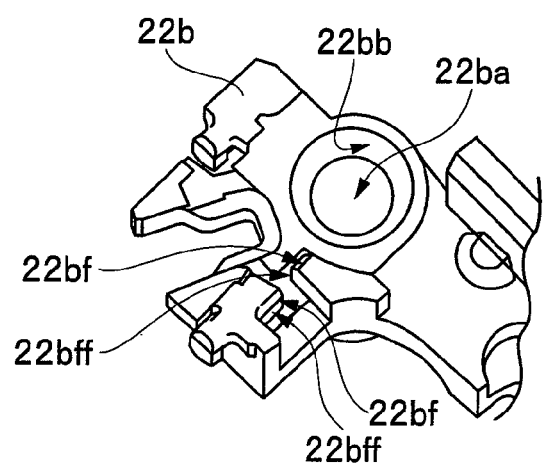
FIG. 8 is an enlarged perspective view of principal parts of the support arm portion (driven member) removed from the second holding barrel in FIG. 5 viewed from a direction [8] in FIG. 5.

Next, a detailed configuration of the lens apparatus 20 which is the essence of the present invention will be described below. Note that FIG. 5 to FIG. 18 are diagrams illustrating individual main components of the lens apparatus 20 of the present embodiment. These drawings will be used as appropriate to describe details of each region. FIG. 5 is a perspective view mainly illustrating a front side of a second holding barrel extracted from the lens apparatus according to the present embodiment. FIG. 6 is an enlarged cross-sectional view of principal parts along a line [6]-[6] in FIG. 5. FIG. 6 shows an integrated normal state of the second holding barrel. FIG. 7 is an enlarged perspective view of principal parts when the vicinity of a through hole of the body is viewed from a direction [7] in FIG. 5 with a support arm portion (driven member) removed from the second holding barrel. FIG. 8 is an enlarged perspective view of principal parts of the support arm portion (driven member) removed from the second holding barrel viewed from a direction [8] in FIG. 5.

Figure 9:
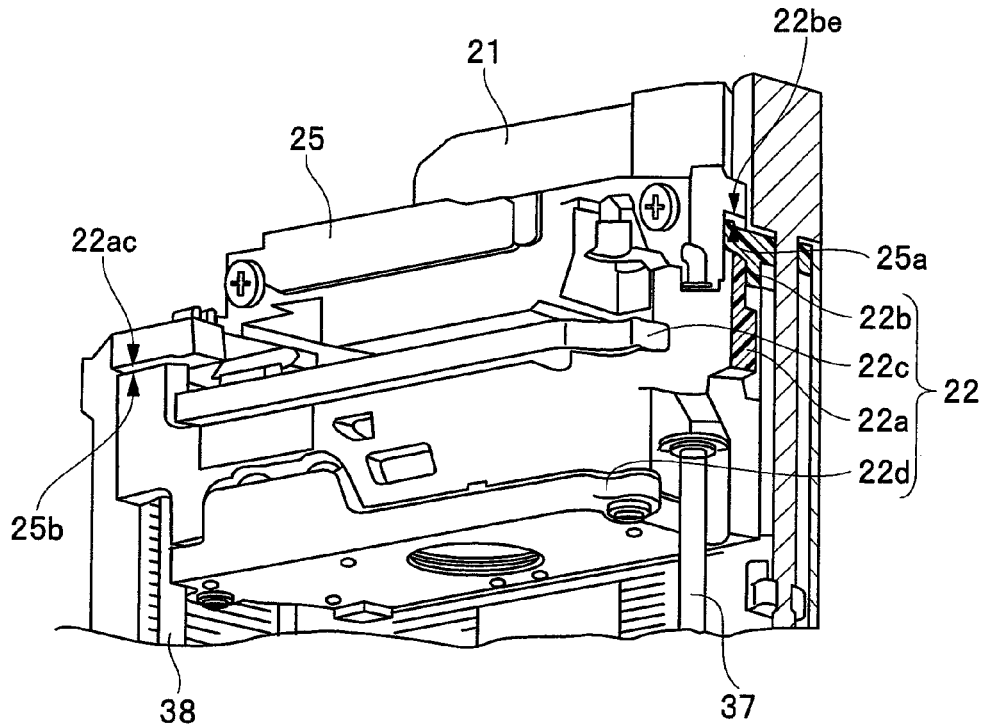
FIG. 9 is an enlarged perspective view of principal parts illustrating part of the lens apparatus according to the one embodiment of the present invention and showing a state in which the second holding barrel has moved closest to the first holding barrel side.
Figure 10:
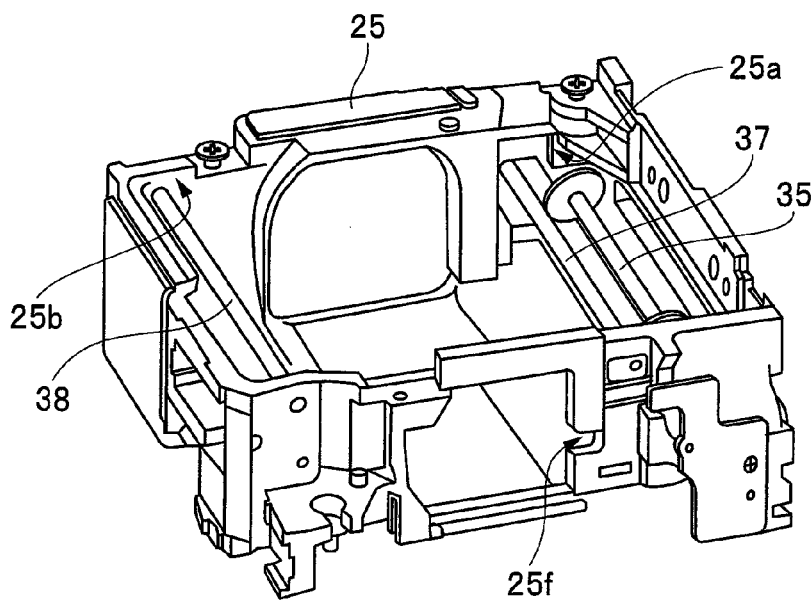
FIG. 10 is an enlarged perspective view of principal parts of a fixed barrel extracted from the lens apparatus according to the one embodiment of the present invention.
Figure 11:
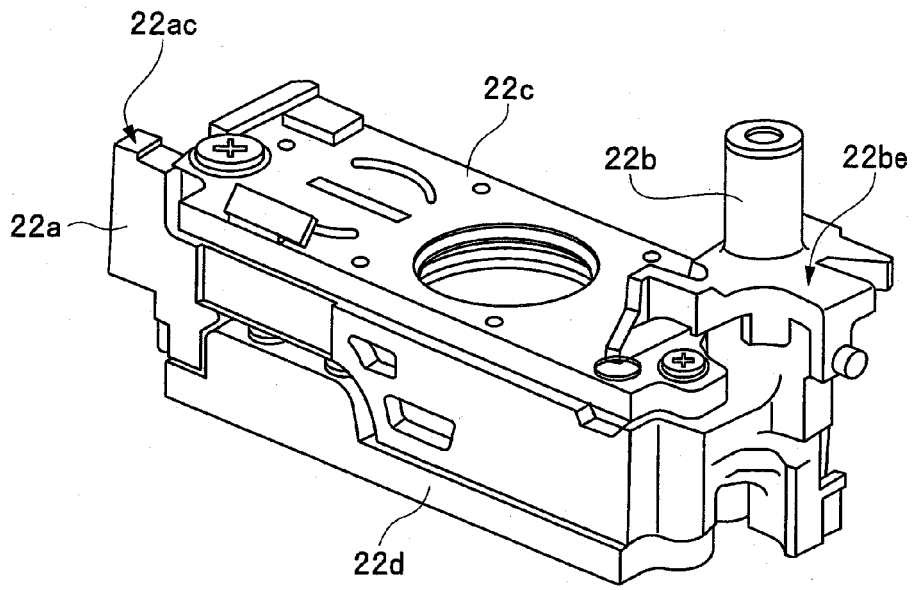
FIG. 11 is a perspective view mainly illustrating a rear side of the second holding barrel extracted from the lens apparatus according to the one embodiment of the present invention.
Figure 12:
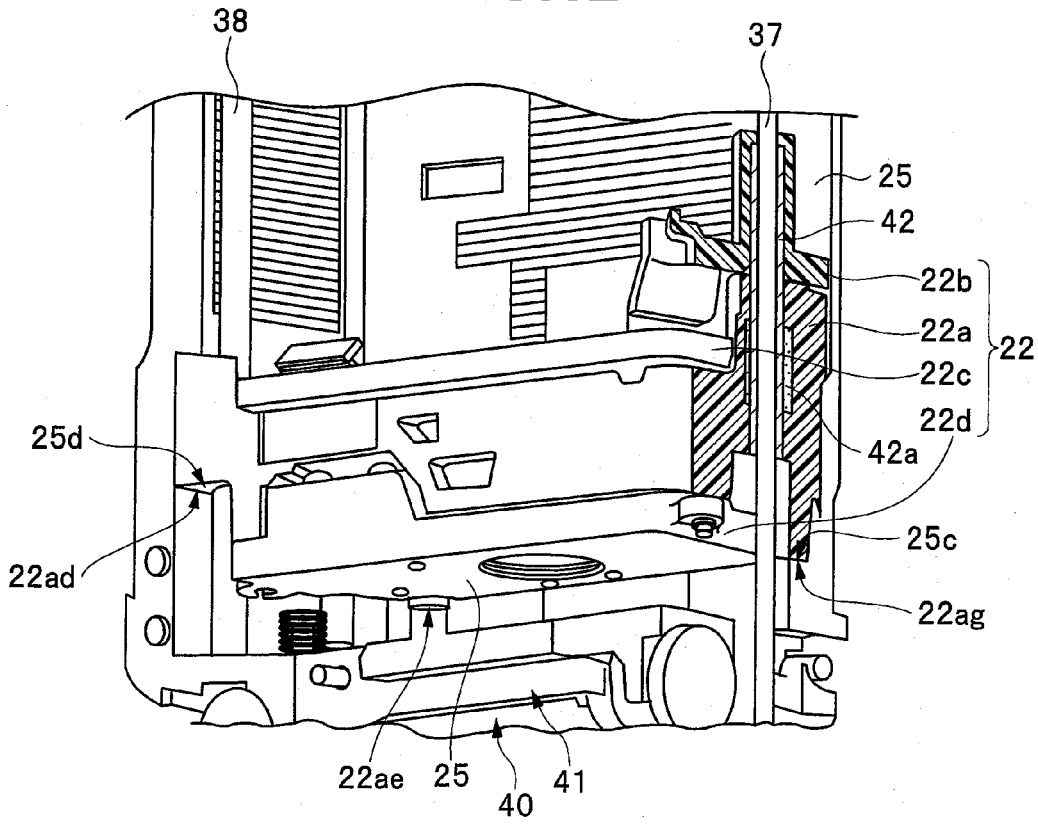
FIG. 12 is an enlarged perspective view of principal parts showing part of the lens apparatus according to the one embodiment of the present invention and illustrating a state in which the second holding barrel has moved closest to an image pickup unit side.
Figure 13:
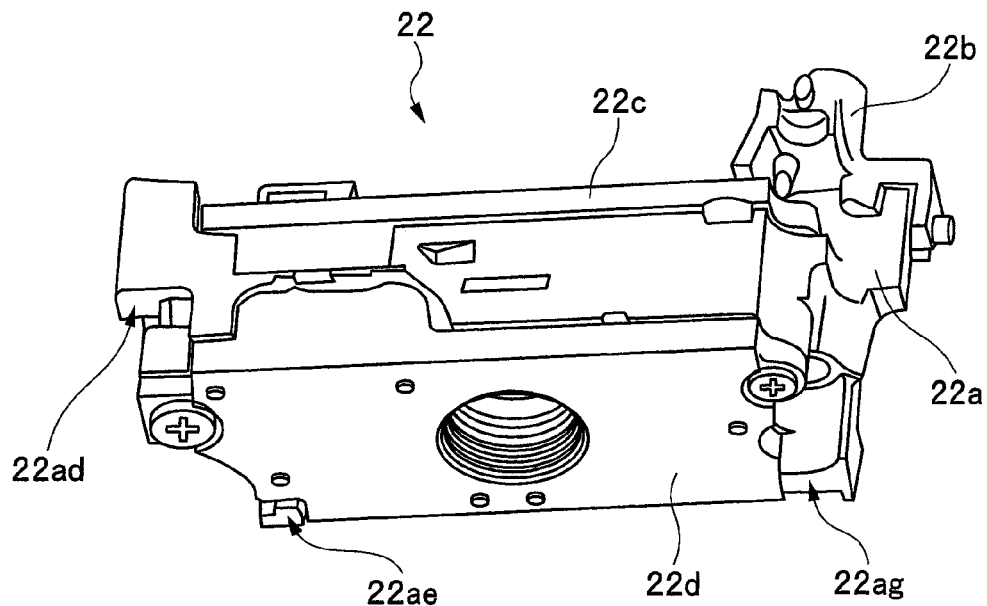
FIG. 13 is a perspective view of the second holding barrel extracted from the lens apparatus according to the one embodiment of the present invention, mainly illustrating a rear side thereof and viewed from a shutter unit side.
Figure 14:
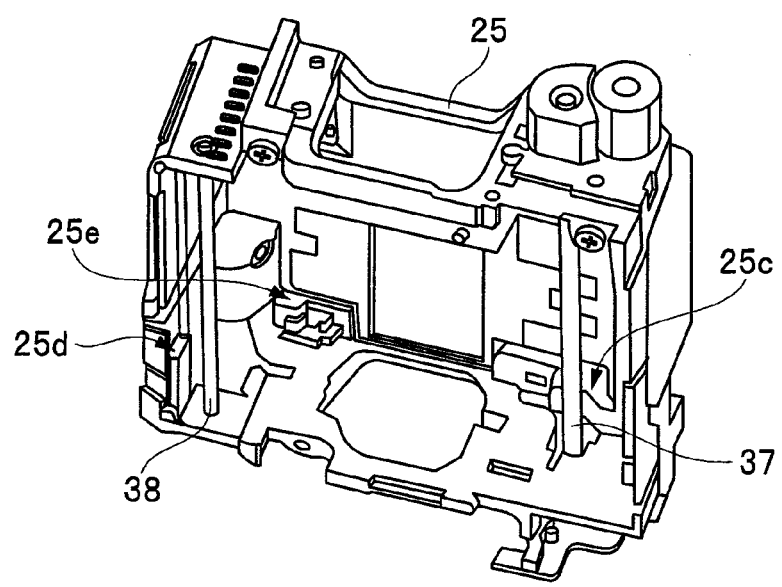
FIG. 14 is an enlarged perspective view of principal parts of the fixed barrel extracted from the lens apparatus according to the one embodiment of the present invention and illustrating a side on which the first holding barrel is arranged.
Figure 15:
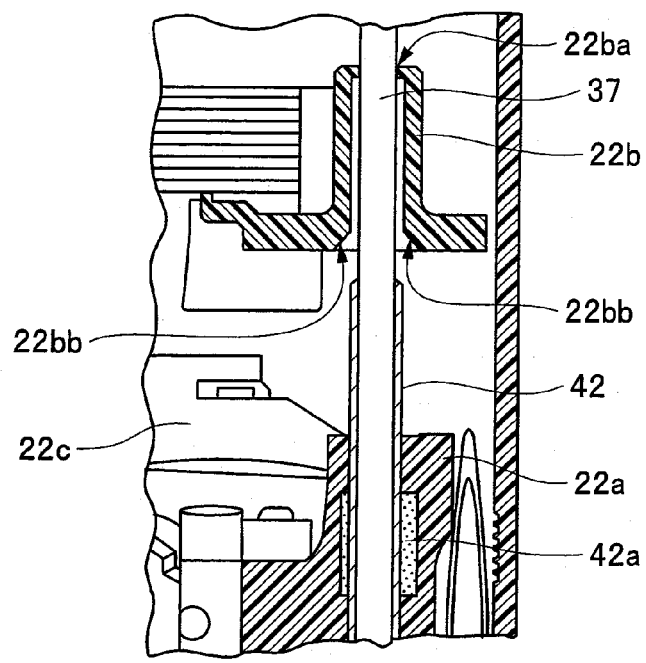
FIG. 15 is an enlarged cross-sectional view of principal parts along a line corresponding to the line [6]-[6] of FIG. 5 in a state in which the body and the support arm portion of the second holding barrel of the lens apparatus according to the one embodiment of the present invention are separated apart.
Figure 16:
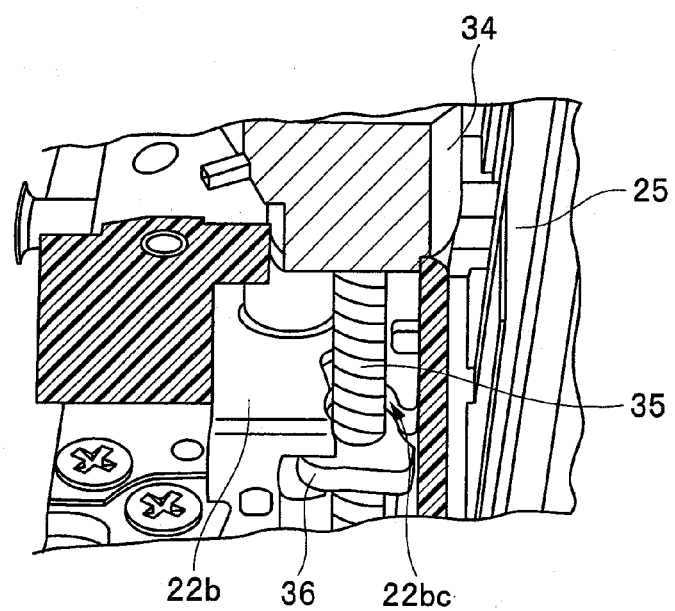
FIG. 16 is an engaged perspective view of principal parts illustrating a region of engagement between the support arm portion of the second holding barrel and a zoom drive unit in FIG. 15.
Figure 17:
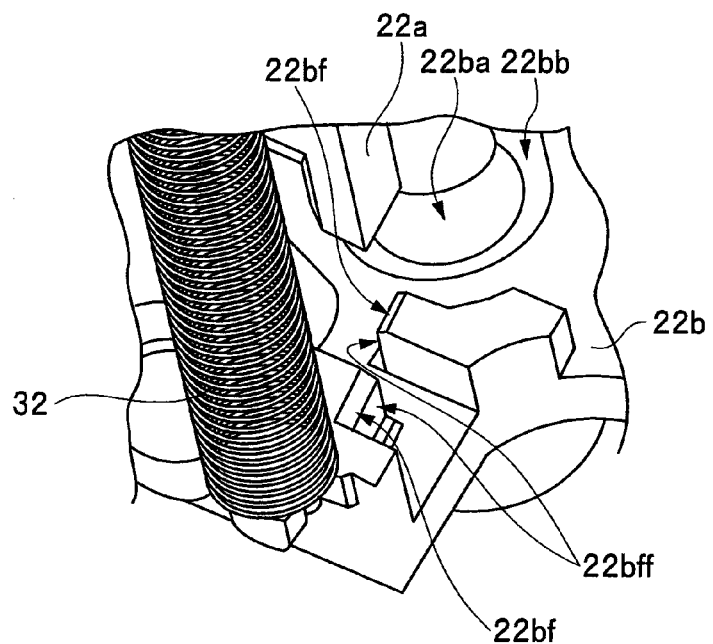
FIG. 17 is an enlarged perspective view of principal parts showing an enlarged view of a mating surface on the support arm portion side out of mating surfaces of the body of the second holding barrel and the support arm portion in the lens apparatus according to the one embodiment of the present invention.
Figure 18:
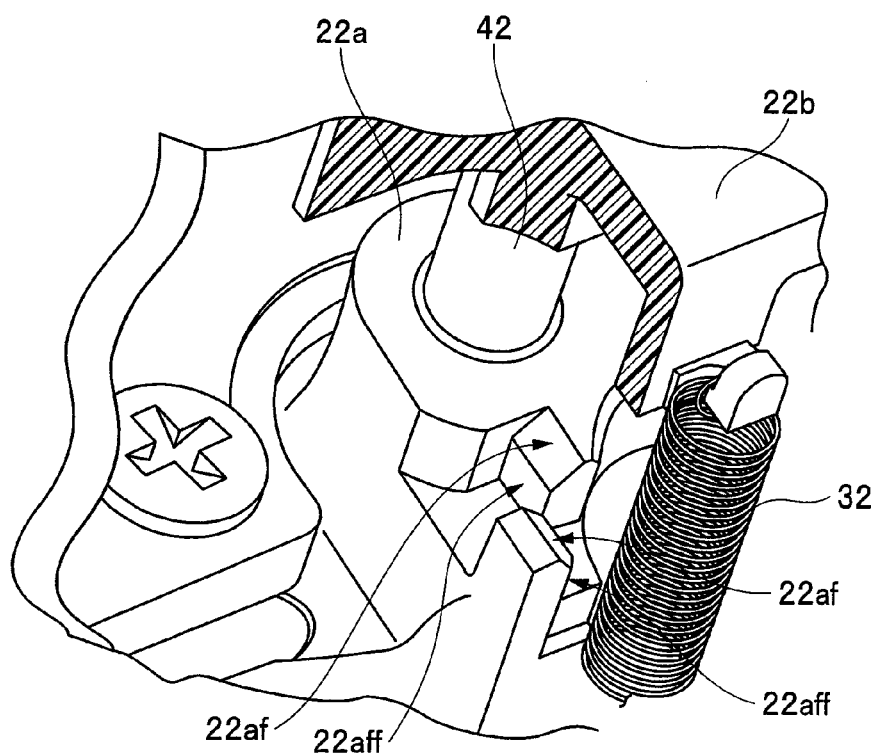
FIG. 18 is an enlarged perspective view of principal parts showing an enlarged view of the mating surface of the body out of the mating surfaces of the body of the second holding barrel and the support arm portion in the lens apparatus according to the one embodiment of the present invention.

FIG. 9 shows part of the lens apparatus according to the present embodiment and is an enlarged perspective view of principal parts illustrating a state in which the second holding barrel has moved closest to the first holding barrel side. FIG. 10 is an enlarged perspective view of principal parts of a fixed barrel extracted from the lens apparatus according to the present embodiment. FIG. 11 is a perspective view mainly illustrating a rear side of the second holding barrel extracted from the lens apparatus according to the present embodiment. FIG. 12 illustrates part of the lens apparatus according to the present embodiment and is an enlarged perspective view of principal parts illustrating a state in which the second holding barrel has moved closest to an image pickup unit side. Note that in FIG. 12, illustration of a third holding barrel is omitted. FIG. 13 mainly illustrates a rear side of the second holding barrel extracted from the lens apparatus according to the present embodiment and is a perspective view thereof viewed from a shutter unit side. FIG. 14 is an enlarged perspective view of principal parts illustrating the fixed barrel extracted from the lens apparatus according to the present embodiment and illustrating a side on which the first holding barrel is arranged. FIG. 15 is an enlarged cross-sectional view of principal parts along the line [6]-[6] in FIG. 5 as in the case of FIG. 6. FIG. 15 shows a state in which the body and the support arm portion of the second holding barrel are separated apart. FIG. 16 is an enlarged perspective view of principal parts illustrating a region of engagement between the support arm portion of the second holding barrel and a zoom drive unit. FIG. 17 and FIG. 18 are enlarged perspective views of principal parts showing an enlarged view of a mating surface between the body of the second holding barrel and the support arm portion. Of the two, FIG. 17 shows a mating surface on the support arm portion side and FIG. 18 shows a mating surface on the body side.

First, a schematic configuration of the lens apparatus 20 of the present embodiment will be described (see FIGS. 2 to 5). The present lens apparatus 20 is constructed of a photographing optical system (first lens group 20a, second lens group 20b, third lens group 20c, fourth lens group 20d), a plurality of lens holding barrels (first holding barrel 21, second holding barrel 22, third holding barrel 23, fourth holding barrel 24), a fixed barrel 25 which is a lens housing, a diaphragm unit 22c, a shutter unit 22d, a plurality of urging members (31, 32, 39), a focus drive unit and a zoom drive unit (zoom motor 34, zoom lead screw 35 which is a feed screw, zoom nut 36 or the like), a plurality of guide shafts (main shaft 37, rotation stopper shaft 38 or the like) or the like.

The four lens groups of the first lens group 20a, the second lens group 20b, the third lens group 20c, and the fourth lens group 20d constitute a photographing optical system in the present lens apparatus 20. Note that each lens group is constructed of a plurality of optical members. For example, the first lens group 20a is made up of a plurality of optical members including an optical lens and a prism for folding an optical axis. Each of the second, third and fourth lens groups 20b, 20c and 20d is made up of at least one or a plurality of optical lenses. In the lens apparatus 20 of the present embodiment, the second lens group 20b and the fourth lens group 20d are lens groups that contribute to zooming, and the third lens group 20c is a lens group that contributes to focusing.

The four lens holding barrels of the first holding barrel 21, the second holding barrel 22, the third holding barrel 23 and the fourth holding barrel 24 hold the four lens groups (20a, 20b, 20c and 20d) in group units respectively and are support members formed in a substantially barrel shape or a substantially box shape. The first holding barrel 21 is a holding barrel that fixes and holds the first lens group 20a. This first holding barrel 21 is fixed and held to the fixed barrel 25 (see FIG. 3, screwed with a screw 21a or the like). In this case, the first holding barrel 21 is arranged so that a front surface of the first lens group 20a faces a region corresponding to the image pickup opening 10a of the camera housing 10 as shown in FIG. 1. Thus, a luminous flux impinging on the image pickup opening 10a from an object (not shown) arranged on the front surface side of the camera 1 directly impinges on the first lens group 20a. The first lens group 20a folds the optical axis O1 of the luminous flux and changes an optical path thereof.

Furthermore, the second holding barrel 22, the third holding barrel 23 and the fourth holding barrel 24 are holding barrels that fix and hold the second lens group 20b, the third lens group 20c and the fourth lens group 20d respectively, and constitute a second lens barrel body. These second holding barrel 22, third holding barrel 23 and fourth holding barrel 24 are arranged so as to be movable in a direction along the optical axis O2 independently of each other (detailed configuration thereof will be described later). Note that in this case, optical axes of the respective optical members of the second lens group 20b, the third lens group 20c and the fourth lens group 20d are arranged so as to coincide with the optical axis O2. Therefore, the object luminous flux which has impinged on the first lens group 20a with the optical axis O1 thereof folded by the first lens group 20a is then configured to move in a direction along the optical axis O2 and reach a light-receiving surface of the image pickup unit 40 arranged on an extension of this optical axis O2.

The fixed barrel 25 is a basic member that constitutes the body of the present lens apparatus 20 and is a lens housing. A plurality of mutually parallel guide shafts, that is, the main shaft 37 and the rotation stopper shaft 38 are fixed in a tensioned state parallel to a direction along the optical axis O2 inside this fixed barrel 25.

The main shaft 37 is a shaft member that supports the second holding barrel 22 and the third holding barrel 23 so as to be movable in the direction along the optical axis O2. Furthermore, the rotation stopper shaft 38 is a shaft member that prevents the second holding barrel 22 and the third holding barrel 23 supported by the main shaft 37 from rotating around the main shaft 37 respectively. That is, while the main shaft 37 supports the second holding barrel 22 and the third holding barrel 23 in a so-called cantilever state, the rotation stopper shaft 38 complementally supports both barrels 22 and 23.

Note that the fourth holding barrel 24 is supported so as to be movable in a direction along the optical axis O2 with respect to the fixed barrel 25 by means of a support mechanism (a shaft member 44 and a 4G drive mechanism which will be described later, also see FIG. 19) aside from the second holding barrel 22 and the third holding barrel 23. The fourth holding barrel 24 and the support mechanism thereof are parts not directly related to the present invention, and so description of a detailed configuration thereof will be omitted.

A zoom drive unit is arranged in the vicinity of a region in which the first holding barrel 21 is arranged and in the vicinity of the main shaft 37 inside the fixed barrel 25. Furthermore, a focus drive unit is arranged in the vicinity of the main shaft 37 in a region on a side facing the region in which the first holding barrel 21 is fixed inside the fixed barrel 25 in addition to the image pickup unit 40 and the image stabilization unit 41 (including image stabilizing motors 41a and 41b or the like).

The zoom drive unit is constructed of the zoom motor 34, a motor flange 34a, the zoom lead screw 35 and the zoom nut 36 or the like. The motor flange 34a is fixed to one surface on which a drive shaft of the zoom motor 34 is provided. One end of the zoom lead screw 35 is integrally connected to the drive shaft of the zoom motor 34. Furthermore, the other end of the zoom lead screw 35 is loosely fitted and rotatably supported at a flange distal end 34aa of the motor flange 34a. The zoom lead screw 35 is screwed into the zoom nut 36. Note that the zoom lead screw 35 is arranged in a direction along the optical axis O2, that is, parallel to the main shaft 37. In this configuration, the zoom nut 36 in the zoom drive unit functions as a drive member that drives a support arm portion 22b (driven member which will be described later) in a predetermined direction (first direction which will be described later).

The focus drive unit is constructed of the third holding barrel 23 and a 3G drive mechanism that drives this third holding barrel 23. The 3G drive mechanism is constructed of a 3G focus motor (not shown), a 3G focus nut 33a, a focus lead screw (not shown) or the like (see FIG. 3).

Furthermore, a 4G drive mechanism that drives the fourth holding barrel 24 is constructed of a 4G zoom motor (43) (not shown) arranged on the opposite side of a cross section 43, a 4G zoom nut 43a, and a 4G zoom lead screw 43b or the like (see FIG. 19 which will be described later). Note that the configuration of the 4G drive unit itself is not directly related to the present invention, and detailed description thereof will be omitted. Furthermore, the third holding barrel 23 contributes to focusing operation and the fourth holding barrel 24 contributes to zooming operation, and the amount of movement of the fourth holding barrel 24 in the optical axis O2 direction is by far smaller than the amount of movement of the second holding barrel 22 in the same direction.

As described above, of the four lens holding barrels, the first holding barrel 21 is a non-movable barrel fixed to the fixed barrel 25. On the other hand, the second holding barrel 22, the third holding barrel 23 and the fourth holding barrel 24 are movable barrels arranged so as to be movable in the optical axis O2 direction with respect to the fixed barrel 25.

Thus, the second holding barrel 22 and the third holding barrel 23 are supported by the main shaft 37 and the rotation stopper shaft 38 so as to be movable in the optical axis O2 direction as described above. Furthermore, the fourth holding barrel 24 is supported by the shaft member 44 instead of the main shaft 37 so as to be movable in the same direction. Note that rotation of the fourth holding barrel 24 is stopped by the fixed barrel 25 and the fourth holding barrel 24 (details will be omitted).

Of the four lens holding barrels, the second holding barrel 22 has a lens barrel body that includes a lens and is arranged so as to be movable along the plurality of guide shafts (37 and 38). That is, the second holding barrel 22 is constructed of a body portion 22a which is a lens barrel body, the support arm portion 22b which is a driven member, the diaphragm unit 22c (may also include an ND filter) and the shutter unit 22d or the like (FIG. 3 and FIG. 4; see FIG. 5 and FIG. 6 for details). The body portion 22a as a whole is formed into a substantially rectangular parallelepiped shape, a through hole is formed in a substantially center thereof, and the second lens group 20b is arranged inside the through hole. A through hole 22aa (see FIG. 4) is perforated in the vicinity of one side edge of the body portion 22a through which the main shaft 37 is inserted, and a through hole or a notch 22ab is formed in the vicinity of the other side edge opposite to this through which the rotation stopper shaft 38 is inserted.

A sleeve 42 is arranged inserted in the through hole 22aa of the body portion 22a of the second holding barrel 22. The sleeve 42 is fixed to the body portion 22a by fixing means such as an adhesive 42a (see FIG. 4 and FIG. 6). The main shaft 37 is inserted through this sleeve 42. The sleeve 42 is formed of, for example, a metal pipe-shaped member so as to smoothly slide over the main shaft 37.

Furthermore, the support arm portion 22b is arranged in the vicinity of the one side edge of the body portion 22a of the second holding barrel 22 so as to be united with the body portion 22a. A through hole 22ba through which the sleeve 42 through which the main shaft 37 is inserted is inserted and a notch 22bc through which the zoom lead screw 35 is inserted are provided in the support arm portion 22b. Therefore, when the body portion 22a and the support arm portion 22b are integrally combined, the through hole 22aa of the body portion 22a communicates with the through hole 22ba of the support arm portion 22b, and the sleeve 42 is arranged inserted through both through holes 22aa and 22ba. Note that in this case, the sleeve 42 is loosely fitted and inserted through the through hole 22ba of the support arm portion 22b.

Furthermore, the zoom lead screw 35 is arranged inserted in the notch 22bc of the support arm portion 22b. In this case, the zoom nut 36 is arranged closer to the image pickup unit 40 than the support arm portion 22b.

On the other hand, the diaphragm unit 22c is fixed to one surface (surface close to the first holding barrel 21) among surfaces orthogonal to the optical axis O2 in the body portion 22a. Furthermore, the shutter unit 22d is fixed to the other surface (surface close to the image pickup unit 40) of the body portion 22a.

As described above, in the lens apparatus 20 of the present embodiment, the second holding barrel 22 is a barrel member in a two-body structure in which the body portion 22a and the support arm portion 22b are made up of different members. When both members (22a and 22b) are combined, the first urging spring 39 (not shown in FIG. 1 to FIG. 4 or the like; see FIG. 5) which is an urging member made of, for example, a taut coil spring is suspended between both members (22a and 22b). Therefore, the body portion 22a and the support arm portion 22b are united together by urging forces attracting each other of the first urging spring 39 in a normal state (state shown in FIG. 5). Here, the first urging spring 39 is a first urging member that urges the support arm portion 22b (driven member) toward the body portion 22a (lens barrel body).

Furthermore, in the second holding barrel 22, when the body portion 22a and the support arm portion 22b are combined, a mating surface between the body portion 22*a* and the support arm portion 22*b* is designed so as to reliably combine both members without backlash, preventing the support arm portion 22*b* from rotating around the main shaft 37 with respect to the body portion 22*a* (see FIG. 7, FIG. 8, FIG. 17 and FIG. 18).

That is, on the mating surface of the body portion 22*a* with the support arm portion 22*b*, as shown in FIG. 7 and FIG. 18, two engagement sloped portions 22*af* inclined at an angle of, for example, approximately 45 degrees with respect to the moving direction of the second holding barrel 22 (direction along the optical axis O2 and axial direction of the main shaft 37) are formed. The two engagement sloped portions 22*af* are dislocated from each other so that both slopes are oriented in opposing directions but not confronting with each other.

Furthermore, two sloped portions 22*bf* arranged at positions facing the two engagement sloped portions 22*af* and formed so as to surface contact with the two engagement sloped portions 22*af* respectively are provided on the mating surface of the support arm portion 22*b* with the body portion 22*a* as shown in FIG. 8 and FIG. 17. Furthermore, flat surfaces 22*aff* and 22*bff* parallel to the optical axis O (parallel to the shaft 37) are provided in the vicinity of the engagement sloped portion 22*af* and in the vicinity of the sloped portion 22*bf* respectively.

These configurations, that is, the two pairs of flat surfaces 22*aff* and 22*bff* parallel to the optical axis O (parallel to the shaft 37) prevent the body portion 22*a* and the support arm portion 22*b* of the second holding barrel 22 from rotating around the main shaft 37 as the rotation center. Furthermore, the engagement sloped portion 22*af* and the sloped portion 22*bf* allow the flat surfaces 22*aff* and 22*bff* which are the rotation stoppers to smoothly mate each other when the body portion 22*a* and the support arm portion 22*b* are separated apart due to a drop impact, and then reunited together.

When the second holding barrel 22, the third holding barrel 23 and the fourth holding barrel 24 configured in this way are assembled into the fixed barrel 25 at predetermined regions, the second holding barrel 22 and the third holding barrel 23 are supported by the main shaft 37 so as to be movable in the optical axis O2 direction, and rotation around the main shaft 37 as the rotation center is restricted by the rotation stopper shaft 38. The fourth holding barrel 24 is supported by the shaft member 44 so as to be movable in the optical axis O2 direction, and rotation thereof is stopped by a concave portion 25*f* of the fixed barrel 25 and the fourth holding barrel 24. Thus, the movable barrels of the second holding barrel 22, the third holding barrel 23 and the fourth holding barrel 24 are configured to move only in the optical axis O2 direction.

Furthermore, in this condition, the second urging spring 31 which is an urging member made up of, for example, a taut coil spring is suspended between the support arm portion 22*b* (driven member) of the second holding barrel 22 and the third holding barrel 23. In a normal condition, the second holding barrel 22 and the third holding barrel 23 do not contact each other. That is, with the body portion 22*a* of the second holding barrel 22 contacting the nut 36 and the third holding barrel 23 contacting the nut 33*a*, the two barrels are urged by mutually attracting urging forces of the second urging spring 31 (see FIG. 3 and FIG. 4). The position in the optical axis O2 direction of the third holding barrel 23 is determined by setting and controlling the position of the 3G focus nut 33*a* (see FIG. 3) in the 3G drive mechanism of the focus drive unit. Therefore, the distance between the second holding barrel 22 and the third holding barrel 23 is set to be a predetermined distance as appropriate through the drive control of the focus drive unit.

Furthermore, the third urging spring 32 which is an urging member made up of, for example, a taut coil spring is suspended between the support arm portion 22*b* (driven member) of the second holding barrel 22 and the (fixed portion close to the image pickup unit 40 of) fixed barrel 25. This third urging spring 32 is a second urging member that urges the support arm portion 22*b* (driven member) of the second holding barrel 22 in a predetermined direction inside the fixed barrel 25, that is, the direction on the side on which the image pickup unit 40 is arranged (hereinafter referred to as "second direction"). That is, the third urging spring 32 plays the role of restricting the movement of the second holding barrel 22 in a predetermined direction inside the fixed barrel 25, that is, a direction on the side on which the first holding barrel 21 is arranged (hereinafter referred to as "first direction") and always pushing the support arm portion 22*b* against the zoom nut 36. The position of (the support arm portion 22*b* of) the second holding barrel 22 in the optical axis O2 direction is determined in this way based on position setting control of the zoom nut 36 by the zoom drive unit. That is, the support arm portion 22*b* of the second holding barrel 22 is a driven member driven in the first direction of the optical axis O2 direction along the main shaft 37 and the rotation stopper shaft 38 which are a plurality of guide shafts by the zoom nut 36 which is driven based on drive control of the zoom drive unit. Note that the third urging spring 32 which is a second urging member as described above acts on the support arm portion 22*b* in the second direction. Thus, the second holding barrel 22 is actually urged by both the second urging spring 31 and the third urging spring 32.

As described above, inside the fixed barrel 25, the second holding barrel 22, the third holding barrel 23 and the fourth holding barrel 24 which are movable barrels are arranged so as to be movable in the optical axis O2 direction. In a normal condition, the second holding barrel 22 and the third holding barrel 23, and the second holding barrel 22 and the fixed barrel 25 are urged by mutually attracting urging forces through the second urging spring 31 and the third urging spring 32 respectively.

In such a configuration, when, for example, the camera 1 receives a drop impact, particularly the second holding barrel 22 and the third holding barrel 23 among the movable barrels of the lens apparatus 20 inside the camera 1 may move in a direction against the urging forces of the second urging spring 31 and the third urging spring 32 in the optical axis O2 direction. Thus, stoppers which are a plurality of impact receiving surfaces are formed inside the fixed barrel 25, restrict the movement of the holding barrels 22 and 23, and alleviate an impact force generated when the moving barrels unexpectedly move due to an impact or the like and collide with each other when the second holding barrel 22 and the third holding barrel 23 respectively move in the optical axis O2 direction, and part of both holding barrels 22 and 23 come into contact with each other. Furthermore, contacted portions which are impact receiving surfaces in a predetermined format are formed in regions corresponding to the plurality of stopper portions on the fixed barrel 25 side on both holding barrel 22 and 23 sides. In this case, the respective impact receiving surfaces are set so as to be parallel to a surface orthogonal to the optical axis O2 (direction shown by an arrow X), that is, the direction in which the second holding barrel 22 and the third holding barrel 23 move.

For example, as shown in FIG. 3 and FIG. 9 to FIG. 11, a first main stopper portion 25*a* and a first sub-stopper portion 25*b* which are impact receiving surfaces are formed on an inner wall surface on a side of the fixed barrel 25 on which the first holding barrel 21 is arranged. The first main stopper portion 25a is formed in the vicinity of the main shaft 37 and the first sub-stopper portion 25b is formed in the vicinity of the rotation stopper shaft 38.

Therefore, when the second holding barrel 22 moves toward the first holding barrel 21 side in the optical axis O2 direction along the main shaft 37 and the rotation stopper shaft 38, a first main contact portion 22be which is an impact receiving surface formed in the support arm portion 22b of the second holding barrel 22 comes into contact with the first main stopper portion 25a. Thus, the first main stopper portion 25a and the first main contact portion 22be are flat surfaces parallel and opposed to each other and the flat surfaces thereof are formed of surfaces parallel to a surface orthogonal to the optical axis O2. At the same time, a first sub-contact portion 22ac which is an impact receiving surface formed in the body portion 22a of the second holding barrel 22 comes into contact with the first sub-stopper portion 25b. Thus, the first sub-stopper portion 25b and the first sub-contact portion 22ac are flat surfaces parallel and opposed to each other and the flat surfaces thereof are formed of surfaces parallel to surfaces orthogonal to the optical axis O2.

Furthermore, as shown in FIG. 12 to FIG. 14, a second main stopper portion 25c, a second sub-stopper A portion 25d, and a second sub-stopper B portion 25e which are impact receiving surfaces are formed on the inner wall surface on a side of the fixed barrel 25 on which the image pickup unit 40 is arranged. The second main stopper portion 25c is formed in the vicinity of the main shaft 37, and the second sub-stopper A portion 25d and the second sub-stopper B portion 25e are formed in the vicinity of a side edge on the side on which the rotation stopper shaft 38 is provided in the respective vicinities of rectangular corners of the second holding barrel 22.

Therefore, when the second holding barrel 22 moves toward the image pickup unit 40 side along the main shaft 37 and the rotation stopper shaft 38 in the optical axis O2 direction, a second main contact portion 22ag which is an impact receiving surface formed in the body portion 22a of the second holding barrel 22 comes into contact with the second main stopper portion 25c. Thus, the second main stopper portion 25c and the second main contact portion 22ag are flat surfaces parallel and opposed to each other, and the flat surfaces thereof are formed of surfaces parallel to surfaces orthogonal to the optical axis O2. At the same time, a second sub-contact portion A22ad which is an impact receiving surface formed in the body portion 22a of the second holding barrel 22 comes into contact with the second sub-stopper A portion 25d.

Note that the second sub-stopper A portion 25d and the second sub-contact portion A22ad are flat surfaces parallel and opposed to each other, and these flat surfaces may also be formed of surfaces parallel to surfaces orthogonal to the optical axis O2 or since their contacting areas are small, the respective surfaces may be inclined surfaces instead of being orthogonal to the optical axis O2 so as to prevent the respective surfaces from crossing each other without contacting each other due to deformation of the fixed barrel and the shaft 37.

Moreover, a second sub-contact portion B22ae which is an impact receiving surface formed in the body portion 22a of the second holding barrel 22 comes into contact with the second sub-stopper B portion 25e. Thus, the second sub-stopper B portion 25e and the second sub-contact portion B22ae are flat surfaces parallel and opposed to each other, and the flat surfaces thereof are formed of surfaces parallel to surfaces orthogonal to the optical axis O2.

On the other hand, as described above, in a normal condition when assembled in the lens apparatus 20, the body portion 22a of the second holding barrel 22 and the support arm portion 22b are united together. In this case, the main shaft 37 is inserted into the sleeve 42 which is inserted and fixed in the through hole 22aa of the body portion 22a. This sleeve 42 is inserted through the through hole 22ba of the support arm portion 22b. In a normal condition, the body portion 22a and the support arm portion 22b are united together by being urged in directions attracting each other via the first urging spring 39.

In such a configuration, when, for example, the camera 1 receives a drop impact, the body portion 22a of the second holding barrel 22 and the support arm portion 22b may be separated apart against the urging force of the first urging spring 39. In this case, the sleeve 42 can be easily removed from the through hole 22ba of the support arm portion 22b, and after that, the body portion 22a and the support arm portion 22b are reunited by an urging force in an attracting direction of the first urging spring 39.

In this situation, when, for example, the sleeve 42 is removed from the through hole 22ba of the support arm portion 22b, as shown in FIG. 15, only the main shaft 37 remains inserted in the through hole 22ba of the support arm portion 22b. In this case, there is a gap (e.g., on the order of approximately 2 mm) corresponding to a thickness of the sleeve 42 between the inner circumferential surface of the through hole 22ba and the outer circumferential surface of the main shaft 37. Then, the support arm portion 22b is in a state of rattling in a direction orthogonal to the axial direction of the main shaft 37.

Furthermore, as described above, when the mating surfaces of the body portion 22a and the support arm portion 22b are separated apart from each other, the two engagement sloped portions 22af are disengaged from the two sloped portions 22bf, and the support arm portion 22b is thereby enabled to rotate around the main shaft 37 as the rotation center. Furthermore, when the body portion 22a and the support arm portion 22b are separated apart due to a drop impact and then come closer to each other to reunite by an urging force of a spring, both members are smoothly mated together via the respective sloped portions and the rotation thereof is stopped by an inclined surface (vertical surface below the inclined surface) perpendicular to the Y axis and parallel to the optical axis.

Thus, in the lens apparatus 20 of the present embodiment, the notch 22bc in which the zoom lead screw 35 is arranged inserted as shown in FIG. 16 is set so as to minimize the gap with the zoom lead screw 35 in order to prevent the rotation of the support arm portion 22b when the body portion 22a and the support arm portion 22b are separated apart.

At the same time, an inside opening portion 22bb of the through hole 22ba of the support arm portion 22b is formed such that the opening edge thereof has a cross section tapered toward the inside of the through hole 22ba so that the diameter of the opening edge is greater than the inner diameter of the through hole 22ba as shown in FIG. 15. When the body portion 22a and the support arm portion 22b are separated apart, and both members are then reunited together by an urging force of the first urging spring 39, adopting such a shape allows the sleeve 42 to be smoothly reinserted and thereby facilitating reunion between the body portion 22a and the support arm portion 22b.

The lens apparatus 20 of the present embodiment is configured as described above. Assuming that the configuration other than that described above conforms to that of a conventional lens apparatus equipped with a folded optics system, detailed description thereof will be omitted.

Operation of the camera 1 to which the lens apparatus 20 of the present embodiment configured as described above is applied at the time of receiving a drop impact during use will be described below using FIG. 19 to FIG. 29.

Figure 19:
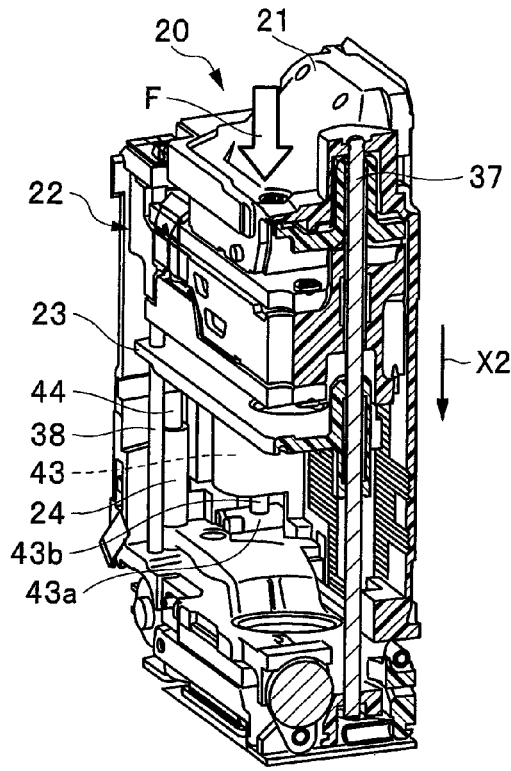
FIG. 19 is a diagram illustrating a state immediately before a drop impact in a second direction X2 is applied to the lens apparatus according to the one embodiment of the present invention.
Figure 20:
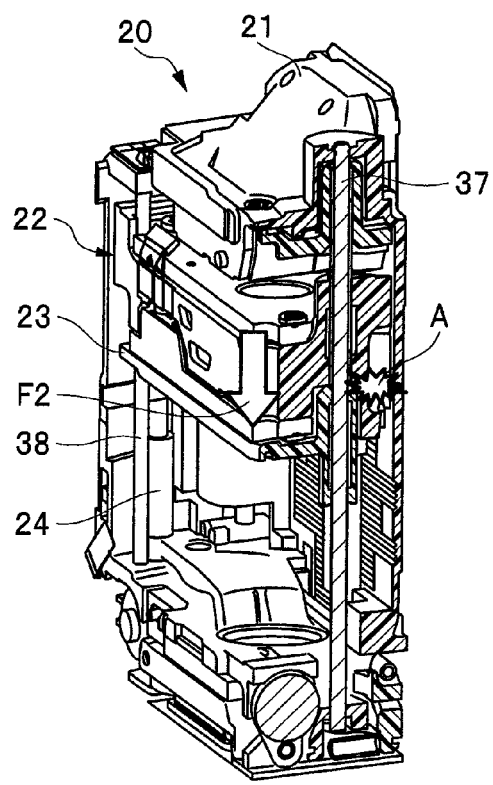
FIG. 20 is a diagram illustrating a state in which a drop impact is applied in the state in FIG. 19, the body of the second holding barrel moves in the second direction X2 and comes into contact with a third holding barrel at point A.
Figure 21:
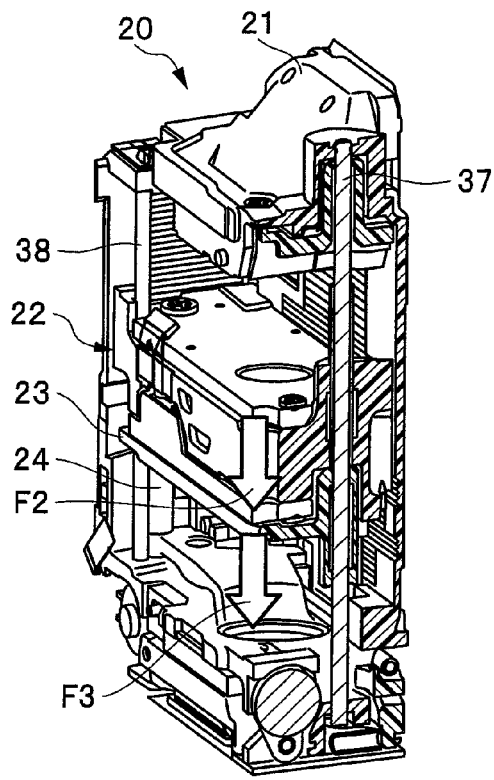
FIG. 21 is a diagram illustrating a situation in which after the state in FIG. 20, the body of the second holding barrel and the third holding barrel are united together and move in the second direction X2.
Figure 22:
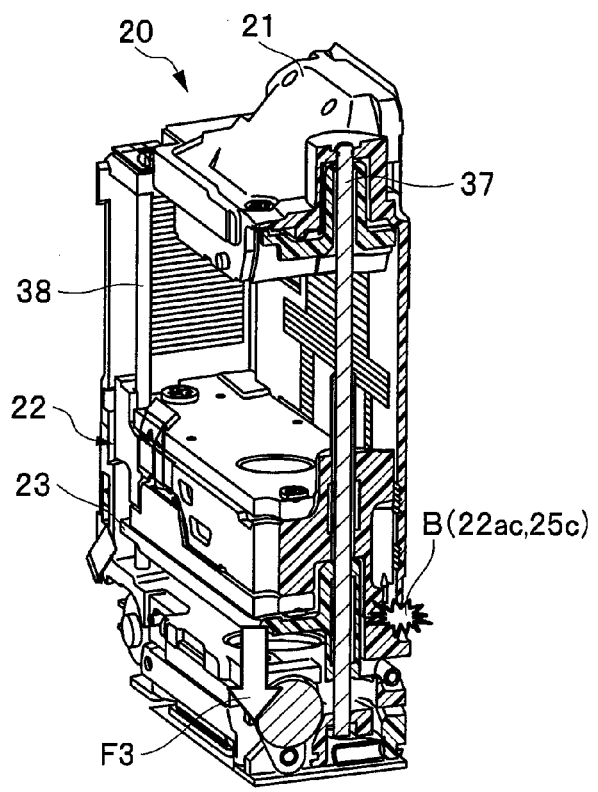
FIG. 22 is a diagram illustrating a state in which after the state in FIG. 21, the second holding barrel and the third holding barrel are united together and come into contact with a second main stopper portion at point B.
Figure 23:
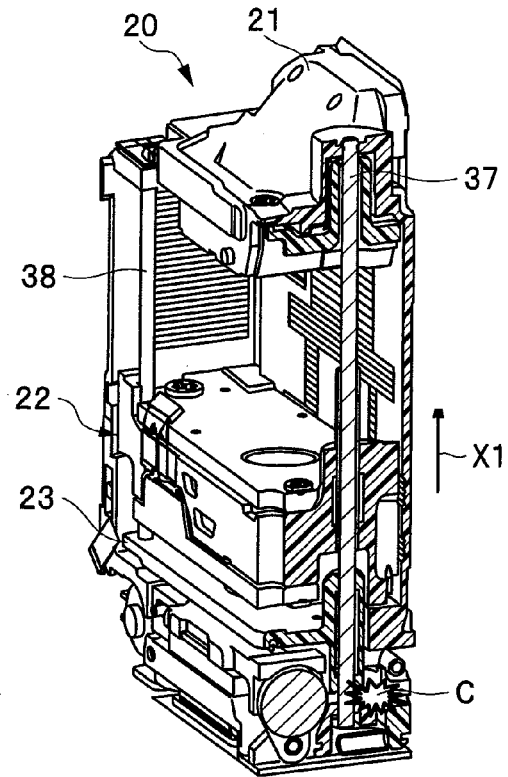
FIG. 23 is a diagram illustrating a state in which after the state in FIG. 22, only the third holding barrel further moves in the second direction X2 and comes into contact with a fixed portion of the fixed barrel at point C.
Figure 24:
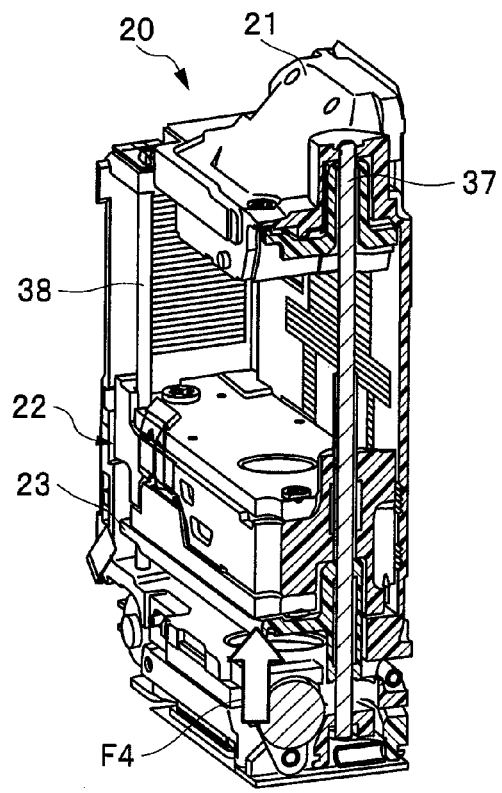
FIG. 24 is a diagram illustrating a situation in which after the state in FIG. 23, the second holding barrel and the third holding barrel move in the first direction X1 by an urging force of each urging spring.
Figure 25:
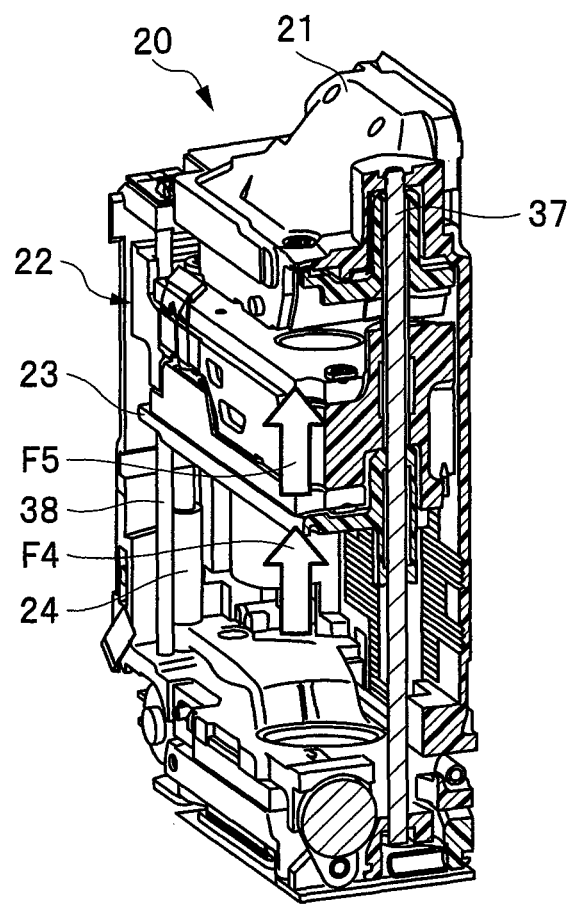
FIG. 25 is a diagram illustrating a state in which after the state in FIG. 24, the third holding barrel comes into contact with a zoom nut and is arranged at a predetermined position, and then only the second holding barrel moves in a first direction X1 by the urging force of the first urging spring.

FIG. 19 to FIG. 29 are diagrams illustrating operation of the lens apparatus of the present embodiment at the time of receiving a drop impact. Among these drawings, FIG. 19 to FIG. 25 illustrate operation when a drop impact in the second direction X2 is applied to the lens apparatus of the present embodiment. Among these drawings, FIG. 19 illustrates a state immediately before a drop impact is applied. FIG. 20 illustrates a state in which a drop impact is applied, and the body of the second holding barrel moves in the second direction X2 and comes into contact with the third holding barrel at point A. FIG. 21 illustrates a situation in which after the state in FIG. 20, the body of the second holding barrel and the third holding barrel are united together and move in the second direction X2. FIG. 22 illustrates a state in which after the state in FIG. 21, the second holding barrel and the third holding barrel are united together and come into contact with the second main stopper portion at point B. FIG. 23 illustrates a state in which after the state in FIG. 22, only the third holding barrel further moves in the second direction X2 and comes into contact with the fixed portion of the fixed barrel at point C. FIG. 24 illustrates a situation in which after the state in FIG. 23, the second holding barrel and the third holding barrel move in the first direction X1 by an urging force of each urging spring. FIG. 25 illustrates a state in which after the state in FIG. 24, the third holding barrel comes into contact with the zoom nut and is arranged at a predetermined position, and then only the second holding barrel moves in the first direction X1 by the urging force of the first urging spring.

First, as shown in FIG. 19, in the lens apparatus 20 of the present embodiment, suppose the second holding barrel 22 and the third holding barrel 23 are arranged at their respective predetermined positions (positions close to the first holding barrel 21) while keeping a predetermined distance from each other in a direction along the main shaft 37. Suppose an impact of predetermined magnitude F including a component in the second direction denoted by reference numeral X2 in FIG. 19, for example, a drop impact is applied to the lens apparatus 20 in this condition. Here, the second direction is an axial direction of the main shaft 37 and is a direction toward the side on which the image pickup unit 40 is arranged, of the direction along the optical axis O2. In this condition, an urging force of the third urging spring 32 acts on the support arm portion 22b of the second holding barrel 22, and the zoom nut 36 regulates the position in the optical axis O2 direction.

In the condition in FIG. 19, when an impact force F including a component in the second direction X2 against the lens apparatus 20 is received, the body portion 22a of the second holding barrel 22 moves away from the support arm portion 22b. That is, since the position of the support arm portion 22b is regulated by the zoom nut 36, the support arm portion 22b stays at that position, whereas the diaphragm unit 22c and the body portion 22a including the shutter unit 22d move toward the second direction X2 along the optical axis O2 against the urging force of the first urging spring 39 and is displaced into a state in FIG. 20. In this case, the body portion 22a of the second holding barrel 22 as shown in FIG. 20 receives a force F2 deriving from the impact force F. Furthermore, the first urging spring 39 has a function of alleviating the movement of the body portion 22a in the second direction X2 caused by the force F2.

In other words, in the second holding barrel 22, upon receiving an impact of predetermined magnitude including a component of the second direction opposite to the first direction, the body portion 22a, which is a lens barrel body, is detached from the support arm portion 22b, which is a driven member, and moves along the main shaft 37 and the rotation stopper shaft 38, which are a plurality of guide shafts.

In the state shown in FIG. 20, the body portion 22a of the second holding barrel 22 comes into contact with the third holding barrel 23 at point A in FIG. 20. Next, the body portion 22a of the second holding barrel 22 continues to move in the X2 direction, which is a second direction, while pushing and uniting with the third holding barrel 23. In this case, as shown in FIG. 21, the body portion 22a of the second holding barrel 22 receives the force F2 and the third holding barrel 23 receives a force F3 in addition to the force F2.

As described above, the second holding barrel 22 is a lens barrel member that holds the second lens group 20b and is configured integrally with the diaphragm unit 22c and the shutter unit 22d in addition to the body portion 22a, which is a lens barrel body. By contrast, the third holding barrel 23 is configured of only a lens barrel member that holds the third lens group 20c. Therefore, the lens apparatus 20 of the present embodiment is configured such that the second holding barrel 22 has a greater weight than the third holding barrel 23. More specifically, there is such a difference that the weight ratio between the second holding barrel 22 and the third holding barrel 23 is, for example, in a range of approximately 10:1 and at least in a range of 2:1. Therefore, when (the body portion 22a of) the second holding barrel 22 moves in the second direction X2 while being guided by the main shaft 37, the third holding barrel 23 moves together with (the body portion 22a of) the second holding barrel 22 in the same second direction X2 against the urging force of the second urging spring 31. In this case, the second urging spring 31 has a function of alleviating the force with which the third holding barrel 23 moves in the second direction X2.

As shown in FIG. 22, when the body portion 22a of the second holding barrel 22 united with the third holding barrel 23 continues to move in the same direction X2, the second main contact portion 22ag of the body portion 22a of the second holding portion 22 comes into contact with the second main stopper portion 25c of the fixed barrel 25 at point B in FIG. 22, thereby restricting the movement of the body portion 22a of the second holding barrel 22 in the same direction X2. This causes the body portion 22a of the second holding barrel 22 to cease to move, and the third holding barrel 23 thereby receives only the force F3, which alleviates the impact corresponding to the force F2.

Next, as shown in FIG. 23, only the third holding barrel 23 further moves in the second direction X2, the third holding barrel 23 comes into contact with the fixed region of the fixed barrel 25 at point C in FIG. 23, thus restricting the movement of the third holding barrel 23 in the same direction X2. In this case, the impact force when the third holding barrel 23 finally comes into contact with the fixed region of the fixed barrel 25 is only the force F3.

Next, as shown in FIG. 23 and FIG. 24, the body portion 22a of the second holding barrel 22 and the third holding barrel 23 move in the first direction X1 by operation of the urging forces of the respective urging springs 31, 32 and 39. In this case, the third holding barrel 23 receives an urging force F4 and the body portion 22a of the second holding barrel 22 moves in the same direction X1 together mainly by the urging force of the spring 39.

Then, as shown in FIG. 25, the third holding barrel 23 comes into contact with the focus nut 33a, the movement thereof in the same direction X1 is thereby restricted and the third holding barrel 23 returns to the predetermined position. In this case, the urging force F4 continues to be applied to the third holding barrel 23, and this force F4 is mainly configured of the urging force of the second urging spring 31, and the urging force F4 is a force that the third holding barrel 23 always receives.

Furthermore, the body portion 22a of the second holding barrel 22 continues to receive a force F5 mainly by the urging force of the first urging spring 39 and continues to move in the first direction X1. The second holding barrel 22 is finally set in a state shown in FIG. 19, that is, the body portion 22a and the support arm portion 22b are united together and both the second holding barrel 22 and the third holding barrel 23 return to the original predetermined positions. In this case, the second holding barrel 22 receives an urging force F7 (see FIG. 29). This force F7 is an urging force mainly configured of the second urging spring 31 and the third urging spring 32, and this urging force F7 is a force that the second holding barrel 22 always receives.

Figure 26:
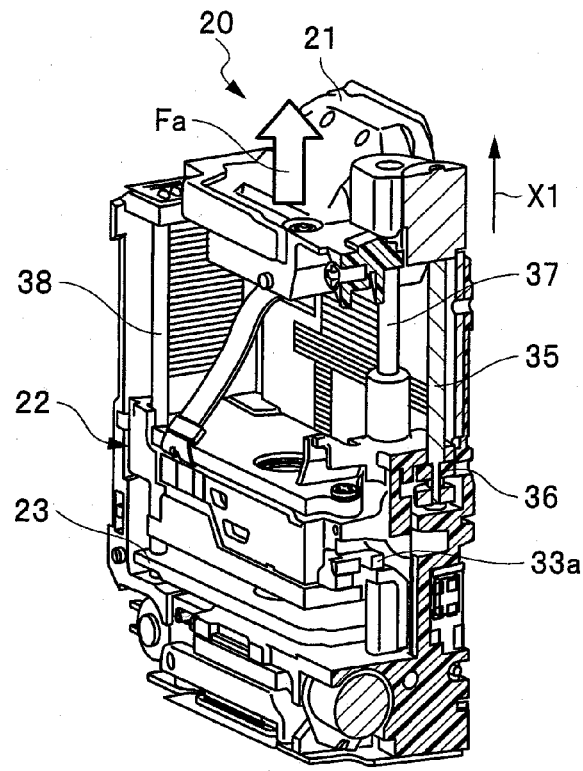
FIG. 26 is a diagram illustrating a state immediately before a drop impact in the first direction X1 is applied to the lens apparatus according to the one embodiment of the present invention.
Figure 27:
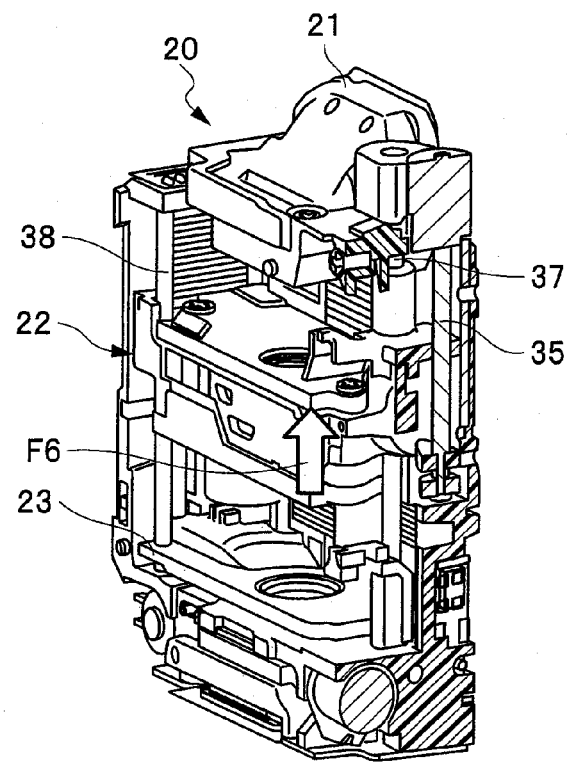
FIG. 27 is a diagram illustrating a state in which a drop impact is applied in the state of FIG. 26 and the second holding barrel moves in the first direction X1.
Figure 28:
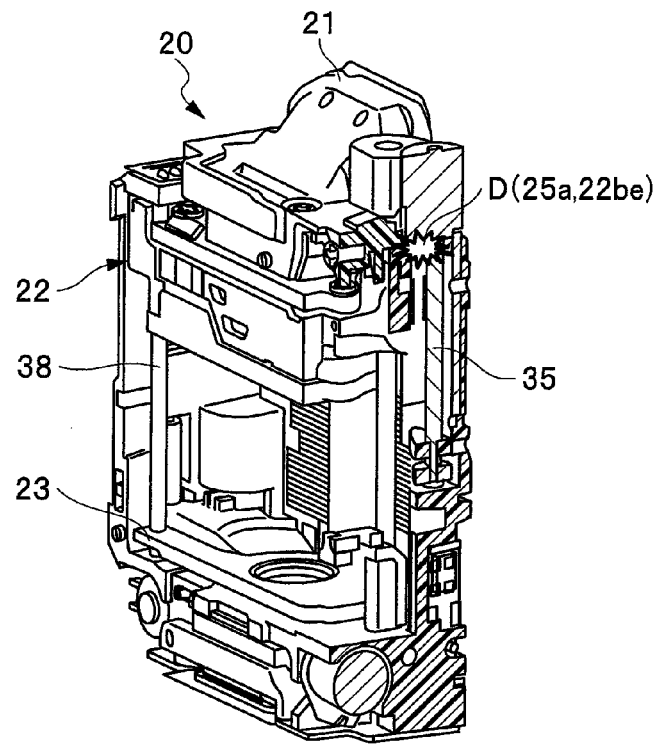
FIG. 28 is a diagram illustrating a state in which after the state in FIG. 27, the second holding barrel further moves in the same direction X1 and comes into contact with the fixed barrel at point D.
Figure 29:
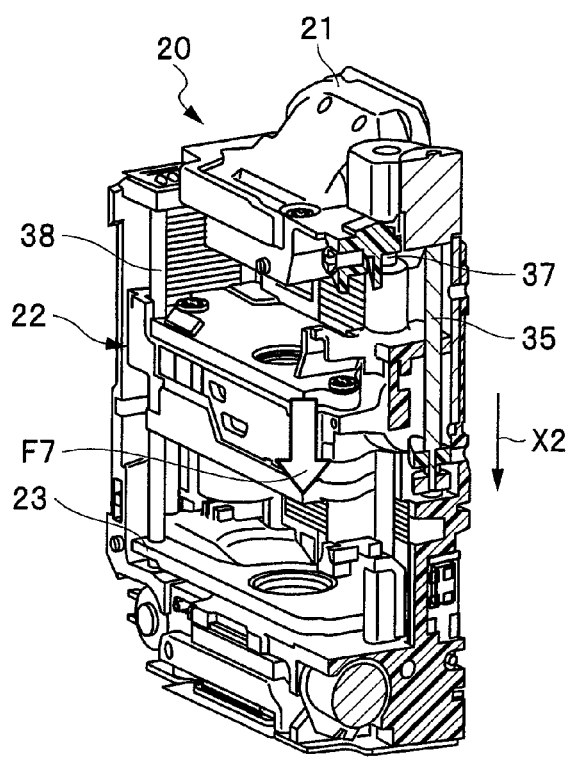
FIG. 29 is a diagram illustrating a situation in which after the state in FIG. 28, the second holding barrel moves in the second direction X2 by the urging force of each urging spring.

On the other hand, FIG. 26 to FIG. 29 illustrate operation when a drop impact in the first direction X1 is applied to the lens apparatus of the present embodiment. Among these drawings, FIG. 26 illustrates a state immediately before the drop impact is applied. FIG. 27 illustrates a state in which the drop impact is applied and the second holding barrel moves in the first direction X1. FIG. 28 illustrates a state in which after the state in FIG. 27, the second holding barrel further moves in the same direction X1 and comes into contact with the fixed barrel at point D. FIG. 29 illustrates a situation in which after the state in FIG. 28, the second holding barrel moves in the second direction X2 by the urging force of each urging spring.

First, as shown in FIG. 26, in the lens apparatus 20 of the present embodiment, suppose the second holding barrel 22 and the third holding barrel 23 are arranged at their respective predetermined positions (positions closer to the image pickup unit 40) while keeping a predetermined distance from each other in a direction along the main shaft 37. In this condition, the movement of the second holding barrel 22 in the second direction X2 is restricted by the zoom nut 36. Furthermore, the movement of the third holding barrel 23 in the first direction X1 is restricted by the focus nut 33a.

Suppose an impact of predetermined magnitude Fa including a component in the first direction denoted by reference numeral X1 in FIG. 26, for example, a drop impact is applied to the lens apparatus 20 in this condition. Here, the first direction is an axial direction of the main shaft 37 and is a direction toward a side in which the first holding barrel 21 is arranged along the optical axis O2.

In the condition in FIG. 26, as described above, the position of the third holding barrel 23 in the first direction X1 is regulated by the focus nut 33a. Therefore, with the body portion 22a and the support arm portion 22b united together, the second holding barrel 22 receives the impact force Fa in the first direction X1, moves in the direction (first direction X1) away from the third holding barrel 23 against the urging forces of the second urging spring 31 and the third urging spring 32 and is displaced into a state in FIG. 27. In this case, as shown in FIG. 27, the second holding barrel 22 receives a force F6 deriving from the impact force Fa. Furthermore, in this case, the second urging spring 31 and the third urging spring 32 have a function of alleviating the movement of the second holding barrel 22 in the first direction X1.

When the state in FIG. 27 turns to a state shown in FIG. 28, the first main contact portion 22be of the support arm portion 22b of the second holding barrel 22 comes into contact with the first main stopper portion 25a of the fixed barrel 25 at point D in FIG. 28. In this way, the movement of the second holding barrel 22 in the first direction X1 is restricted.

Next, as shown in FIG. 29, the second holding barrel 22 moves in the second direction X2 through operation of the urging forces (force F7) of the respective urging springs 31 and 32. The second holding barrel 22 finally returns to the original predetermined position shown in FIG. 26. Note that while the second holding barrel 22 is moving in the first direction X1 and the second direction X2 described in FIG. 26 to FIG. 29, the body portion 22a and the support arm portion 22b always remain united together through operation of the urging force of the first urging spring 39.

As described above, the operation of the present embodiment described using FIG. 19 to FIG. 29 can be summarized as follows. That is, when the lens apparatus including the fixed barrel 25 (lens housing) receives an impact caused by a drop of predetermined magnitude including a component of the first direction, the zoom nut 36 (drive member) of the zoom drive unit and the support arm portion 22b (driven member) of the second holding barrel 22 are separated apart, and the support arm portion 22b (driven member) and the body portion 22a (lens barrel body) are united together and move in the first direction.

Furthermore, when the lens apparatus including the fixed barrel 25 (lens housing) receives an impact caused by a drop or the like of predetermined magnitude including a component of the second direction, the zoom nut 36 (drive member) blocks the movement of the support arm portion 22b (driven member) of the second holding barrel 22 in the second direction, the support arm portion 22b (driven member) and the body portion 22a (lens barrel body) are thereby separated apart and the body portion 22a (lens barrel body) moves along the main shaft 37 and the rotation stopper shaft 38 (a plurality of guide shafts).

When the lens apparatus 20 including the fixed barrel 25 (lens housing) receives an impact caused by a drop or the like of predetermined magnitude including the component of the first direction, the first main stopper portion 25a (impact receiving surface of the lens housing) of the fixed barrel 25 comes into contact with the first main contact portion 22be (impact receiving surface of the driven member) of the support arm portion 22b of the second holding barrel 22 first, and then the first sub-stopper portion 25b (impact receiving surface of the lens housing) of the fixed barrel 25 comes into contact with the first sub-contact portion 22ac (impact receiving surface of the lens barrel body) of the body portion 22a of the second holding barrel 22 to thereby receive an impact caused by a drop or the like.

Furthermore, when the lens apparatus 20 including the fixed barrel 25 (lens housing) receives an impact caused by a drop or the like of predetermined magnitude including the component of the second direction, the second main stopper portion 25c (impact receiving surface of the lens housing) of the fixed barrel 25 comes into contact with the second main contact portion 22ag (impact receiving surface of the lens barrel body) of the body portion 22a of the second holding barrel 22 first, and then the second sub-stopper A portion 25d (impact receiving surface of the lens housing) of the fixed barrel 25 comes into contact with the second sub-contact portion A22ad (impact receiving surface of the lens barrel body) of the body portion 22a of the second holding barrel 22 at the same time as the second sub-stopper B portion 25e (impact receiving surface of the lens housing) of the fixed barrel 25 comes into contact with the second sub-contact portion B22ae (impact receiving surface of the lens barrel body) of the body portion 22a of the second holding barrel 22 to thereby receive the impact caused by a drop or the like.

Note that the contact between the second sub-stopper A portion 25d (impact receiving surface of the lens housing) of the fixed barrel 25 and the second sub-contact portion A22*ad* (impact receiving surface of lens barrel body) of the body portion 22*a* of the second holding barrel 22, and the contact between the second sub-stopper B portion 25*e* (impact receiving surface of the lens housing) of the fixed barrel 25 and the second sub-contact portion B22*ae* (impact receiving surface of the lens barrel body) of the body portion 22*a* of the second holding barrel 22 may be made sequentially.

Therefore, according to the above embodiment, when the lens apparatus 20 receives an impact such as a drop of predetermined magnitude, it is possible to alleviate the impact received by parts such as (the support arm portion 22*b*; driven member of) the second holding barrel 22 and the zoom nut 36 (drive member) of the zoom drive unit and prevent damage to the parts irrespective of the direction in which the impact or the like is applied.

Furthermore, since the impact receiving surfaces (25*a*, 25*b*, 25*c*, 25*d*, 25*e* and 22*be*, 22*ac*, 22*ac*, 22*ad* and 22*ae*) are formed in the vicinities of a plurality of guide shafts (37 and 38), when the second holding barrel 22 and the third holding barrel 23 or the like move after receiving the impact or the like and collide with the fixed member, it is possible to prevent generation of rotation moment around the guide shafts (37 and 38).

Since a plurality of impact receiving surfaces are provided on a plurality of lens barrel bodies which are movable along a plurality of guide shafts, when the lens apparatus 20 receives an impact of predetermined magnitude, the impact receiving surface of one lens barrel body (second holding barrel 22) and the impact receiving surface of the other second lens barrel body (third holding barrel 23) are configured to come into contact on a plurality of surfaces. This makes it possible to effectively alleviate the impact received.

The first urging spring 39, the second urging spring 31 (first urging member) and the third urging spring 32 (second urging member) are provided so as to urge the respective predetermined barrel members in a direction in which the members attract each other in a normal state, and therefore when the lens apparatus 20 receives an impact of predetermined magnitude including the component of the first direction or the second direction, the respective urging members can alleviate the impact.

The plurality of lens barrel bodies (the second holding barrel 22 and the third holding barrel 23) which are movable along the guide shaft (main shaft 37) are respectively provided with the through holes (22*aa* and 22*ba*) through which a plurality of guide shafts penetrate, the metal sleeve 42 is inserted into at least one of the guide shafts corresponding to the respective through holes, the sleeve 42 is loosely fitted and inserted into the through hole 22*ba* of the support arm portion 22*b* (driven member) of the second holding barrel 22 and integrally arranged inserted in the through hole 22*aa* of the body portion 22*a* (lens barrel body), and the support arm portion 22*b* and the body portion 22*a* are urged by the first urging member 39 (first urging member) in a direction in which the members attract each other, and therefore the body portion 22*a* of the second holding barrel 22 and the support arm portion 22*b* are always configured to be united together in a normal state. On the other hand, when an impact or the like in the first direction or the second direction is received, the body portion 22*a* and the support arm portion 22*b* are configured to be separable against the urging force of the first urging member 39. This configuration allows the received impact force to be alleviated.

Note that it goes without saying that the present invention is not limited to the aforementioned embodiment, but various modifications and applications can be made without departing from the scope and spirit of the present invention. Furthermore, the embodiment includes inventions at various stages, and the various inventions can be extracted by an appropriate combination of a plurality of disclosed configuration requirements. For example, even when some of all configuration requirements shown in the embodiment are deleted, as long as the problems to be solved by the invention can be solved and the effects of the present invention can be achieved, the configuration from which the configuration requirements are deleted can be extracted as an invention. The invention is not constrained by any specific embodiments except being limited by the attached claims.

The present invention is not limited to an image pickup apparatus which is an electronic device specialized for the photographing function of a digital camera or the like, but is likewise widely applicable to electronic devices in other formats having an image pickup function provided with a taking lens optical system, for example, to various portable electronic devices with an image pickup function such as a cellular phone, a recording device, an electronic notebook, a personal computer, a game machine, a television, a clock, and a navigation device using GPS (global positioning system).

What is claimed is:

1. A lens apparatus comprising:
    a lens housing;
    a driven member that is driven in a first direction along an optical axis;
    a lens barrel body that comprises a lens, is arranged so as to be movable along the optical axis, is separated from the driven member upon receiving an impact of predetermined magnitude including a component of a second direction opposite to the first direction and moves along the optical axis; and
    a drive member that drives the driven member in the first direction,
    wherein when the lens housing receives an impact of predetermined magnitude including a component of the first direction, the drive member and the driven member are separated apart, and the driven member and the lens barrel body move together in the first direction, and
    when the lens housing receives an impact of predetermined magnitude including the component of the second direction, the drive member prevents the driven member from moving in the second direction, the driven member and the lens barrel body are thereby separated apart, and the lens barrel body moves along the optical axis.

2. The lens apparatus according to claim 1, wherein an impact receiving surface is formed in each of the lens housing, the driven member and the lens barrel body, and when the lens housing receives an impact of predetermined magnitude including the component of the first direction or the second direction, the impact receiving surface of the lens housing and the impact receiving surface of the driven member or the lens barrel body come into contact with each other to receive the impact.

3. The lens apparatus according to claim 1,
    wherein a plurality of guide shafts parallel to each other are fixed to the lens housing, and
    the impact receiving surface formed in each of the lens housing, the driven member and the lens barrel body is formed in a vicinity of each of the plurality of guide shafts.

4. The lens apparatus according to claim 1, further comprising:
    a first urging member that urges the driven member to the lens barrel body; and a second urging member that urges the driven member in the second direction, wherein when an impact of predetermined magnitude including the component of the first direction or the second direction is received, the first urging member and the second urging member alleviate the impact.

5. The lens apparatus according to claim 1, wherein a plurality of impact receiving surfaces are provided in the second direction of the lens barrel body, at least one second lens barrel body which is movable along a plurality of guide shafts is arranged, and when the lens housing receives an impact of predetermined magnitude including the component of the second direction, the impact receiving surface of the lens barrel body and the impact receiving surface of the second lens barrel body come into contact with each other on a plurality of surfaces to thereby alleviate the impact including the component of the second direction.

6. The lens apparatus according to claim 4, wherein a plurality of guide shafts parallel to each other are fixed to the lens housing, through holes through which the plurality of guide shafts penetrate are provided in the driven member and the lens barrel body, a metal sleeve is inserted through at least one of the plurality of guide shafts corresponding to the through holes, the metal sleeve is loosely fitted and inserted into the through hole of the driven member and integrally arranged inserted in the through hole of the lens barrel body, and the driven member and the lens barrel body are urged by the first urging member in directions attracting each other.

7. The lens apparatus according to claim 1, wherein a shutter unit and a diaphragm unit are arranged in the lens barrel body.

8. A lens apparatus comprising:

a lens housing to which a plurality of guide shafts parallel to each other are fixed;

a driven member that is driven in a first direction along the plurality of guide shafts;

a lens barrel body that comprises a lens, is arranged so as to be movable along the plurality of guide shafts, and is separated from the driven member upon receiving an impact of predetermined magnitude including a component of a second direction opposite to the first direction and moves along the plurality of guide shafts;

a shutter unit arranged on one surface of the lens barrel body;

a diaphragm unit arranged on the other surface of the lens barrel body;

a feed screw arranged parallel to the plurality of guide shafts;

a nut that drives the driven member in the first direction through rotation of the feed screw;

a first urging member that urges the driven member to the lens barrel body; and a second urging member that urges the driven member in the second direction, wherein when the lens housing receives an impact of predetermined magnitude including a component of the first direction, the nut and the driven member are separated apart, the lens barrel body including the shutter unit and the diaphragm unit and the driven member are united together and move in the first direction along the guide shaft, and when the lens housing receives an impact of predetermined magnitude including the component of the second direction, the nut blocks the movement of the driven member in the second direction, the driven member and the lens barrel body are thereby separated apart and the lens barrel body including the shutter unit and the diaphragm unit moves in the second direction along the guide shaft.

* * * * *